(12) United States Patent
Shiga et al.

(10) Patent No.: US 11,563,356 B2
(45) Date of Patent: Jan. 24, 2023

(54) WIPER MOTOR

(71) Applicant: DENSO CORPORATION, Kariya (JP)

(72) Inventors: Akira Shiga, Kariya (JP); Akio Oshiro, Kariya (JP); Yuuji Nagata, Kariya (JP); Mitsuaki Ooyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 599 days.

(21) Appl. No.: 16/606,269

(22) PCT Filed: Apr. 19, 2018

(86) PCT No.: PCT/JP2018/016222
§ 371 (c)(1),
(2) Date: Oct. 18, 2019

(87) PCT Pub. No.: WO2018/194147
PCT Pub. Date: Oct. 25, 2018

(65) Prior Publication Data
US 2020/0127526 A1    Apr. 23, 2020

(30) Foreign Application Priority Data

Apr. 20, 2017  (JP) ............................. JP2017-084035
Mar. 27, 2018  (JP) ............................. JP2018-060588

(51) Int. Cl.
*H02K 5/22*       (2006.01)
*H02K 5/14*       (2006.01)
(Continued)

(52) U.S. Cl.
CPC ................ *H02K 5/225* (2013.01); *B60S 1/08* (2013.01); *H02K 5/145* (2013.01); *H02K 5/24* (2013.01)

(58) Field of Classification Search
CPC .......... H02K 5/225; H02K 5/145; H02K 5/24; B60S 1/08
See application file for complete search history.

(56) References Cited

FOREIGN PATENT DOCUMENTS

| CN | 102273052 A | 12/2011 |
| JP | H09-226526 A | 9/1997 |

(Continued)

OTHER PUBLICATIONS

Nov. 2, 2020 Office Action issued in Chinese Patent Applicaiton No. 201880026022.1.

(Continued)

*Primary Examiner* — Jianchun Qin
(74) *Attorney, Agent, or Firm* — Oliff PLC

(57) ABSTRACT

A wiper motor including an electrically conductive housing in which a speed reduction mechanism is housed, a motor body housed within a yoke joined to the housing and having a power supply terminal that contacts a commutator so as to supply electric power to a rotor, and having a brush that includes a ground terminal having one end in contact with the commutator and another end connected to an electrically conductive partitioning wall of the housing that covers an opening in the yoke, a power supply line configured to supply electric power to the power supply terminal via a noise-suppression choke coil, a ground line connected to the partitioning wall and to ground, and a capacitor connecting the power supply line with the ground line, such that a noise component flowing through the ground line passes through the choke coil.

14 Claims, 24 Drawing Sheets

(51) Int. Cl.
*H02K 5/24* (2006.01)
*B60S 1/08* (2006.01)

(56) References Cited

FOREIGN PATENT DOCUMENTS

| | | | |
|---|---|---|---|
| JP | 2003-134722 A | | 5/2003 |
| JP | 2008-99524 A | | 4/2008 |
| JP | 2014155406 A | * | 8/2014 |

OTHER PUBLICATIONS

Jul. 17, 2018 International Search Report issued in International Patent Application No. PCT/JP2018/016222.

* cited by examiner

WIPER MOTOR

TECHNICAL FIELD

The present disclosure relates to a wiper motor.

BACKGROUND ART

Brushed DC motors employed as wiper motors or the like have a rotor that rotates when a rotor coil is supplied with electric power through a brush. In brushed DC motors, as the rotor rotates, electrical connectivity between the brush and a commutator provided coaxially to the rotor is switched intermittently. This switching of the electrical connectivity is a type of switching operation, and a noise component is liable to be generated by the electric potential fluctuating at high frequency accompanying this switching operation.

FIG. 8 is a schematic diagram illustrating a typical wiper motor 100. As illustrated in FIG. 8, the wiper motor 100 is configured by a motor section 120, in which a stator and a rotor are accommodated, and a speed reduction section 130 that is configured by a worm gear mechanism provided at a terminal end of a rotation shaft of the rotor so as to reduce the rotation speed of the rotation shaft.

The stator and the rotor of the motor section 120 are provided within a yoke 122 configured by die-cast aluminum or the like. The interior of the yoke 122 is formed in a hollow, substantially circular cylinder shape, and the stator and the rotor are accommodated in this interior space.

In the speed reduction section 130, the above-mentioned worm gear mechanism is accommodated inside die-cast aluminum housing 132, and the housing 132 and the worm gear mechanism are covered by a resin housing cover 134. The housing cover 134 is provided with a connector 136, and electric power to rotate the wiper motor 100 is supplied through the connector 136.

FIG. 9 is a block diagram illustrating an example of an electrical configuration of the wiper motor 100. The connector 136 includes a High terminal 136H through which electric power is supplied to rotate the wiper motor 100 at high speed, a Low terminal 136L through which electric power is supplied at a lower voltage than through the High terminal 136H to rotate the wiper motor 100 at a lower speed than the above-mentioned high speed rotation, and a ground terminal 136N electrically connected to a negative terminal 140N of a brush 140 of the wiper motor 100 through the die-cast aluminum housing 132 and yoke 122. The electrical connection from the negative terminal 140N to ground is made through the housing 132 of the wiper motor 100 and the like, enabling the structure of the wiper motor 100 to be simplified.

The power supplied from the High terminal 136H is supplied to a commutator 142 through a choke coil 138H that removes a noise-causing high frequency component, and a positive terminal 140H of the brush 140. The electric power supplied from the Low terminal 136L is supplied to the commutator 142 through a choke coil 138L that removes a noise-causing high frequency component, and a positive terminal 140L of the brush 140. Although the motor section 120 includes the rotor and the stator, these are omitted from illustration in FIG. 9.

As described above, a high frequency noise component is generated accompanying the rotation of the wiper motor 100. This noise component passes through the yoke 122 and the housing 132 as illustrated by a broken line 160 from the negative terminal 140N of the brush 140.

Although direct current noise-prevention capacitors 146, 148 do not allow direct current to pass, the noise-prevention capacitors 146, 148 do allow alternating current to pass. A noise component from the electric potential fluctuating at high frequency is guided through the noise-prevention capacitor 148 to the choke coil 138L. This noise component can also be guided to the choke coil 138H through the yoke 122, the housing 132, and the noise-prevention capacitor 146.

The choke coils 138H, 138L are high inductance elements, and exhibit high impedance with respect to the high frequency noise component. Accordingly, this noise component is blocked by the choke coils 138H, 138L. Even supposing the blocking of the noise component by the choke coils 138H, 138L were insufficient, the noise component would be supplied to the wiper motor 100 through the positive terminals 140H, 140L, and would be eliminated with the electric power used to rotate the wiper motor 100.

However, in the configuration illustrated in FIG. 9, the electrical connection between the path taken by power illustrated by the broken line 160 and the capacitor 146 is unnecessarily long, and the high frequency noise component is liable to flow toward the ground terminal 136N through the yoke 122 and the housing 132 as illustrated by the broken line 160 in FIG. 8, instead of to the noise-prevention capacitor 146. This results in an issue whereby the noise component would not be effectively eliminated, such that the noise component is liable to spread through the yoke 122 and the housing 132. In order to prevent the noise component from spreading to the exterior, a separate shield becomes necessary in order to suppress the noise component from radiating to the yoke 122 and the housing 132.

Japanese Patent Application Laid-Open (JP-A) No. 2003-134722 discloses an invention relating to a wiper motor in which a lead wire is used to connect a negative terminal of a brush to a ground terminal of a connector in order to block the passage of a noise component through housing and the like.

JP-A No. H09-226526 discloses an invention relating to a wiper motor in which a negative terminal of a brush is connected to a ground terminal of a connector through a metal plate sandwiched between metal housing and a resin housing cover during assembly of the housing cover to the housing, in order to block the passage of a noise component through the housing and the like.

SUMMARY OF INVENTION

Technical Problem

However, in the wiper motor disclosed in JP-A No. 2003-134722, there is a possibility of the lead wire breaking, since the fragile lead wire is installed to a speed reduction section that includes a rotating worm gear. An operation to connect the lead wire is also complex.

In the wiper motor disclosed in JP-A No. H09-226526, it is not easy to attach the metal plate connecting the negative terminal of the brush to the ground terminal of the connector in a predetermined manner during assembly of the housing cover. In cases in which the metal plate cannot be attached in the predetermined manner, not only is an electrical connection not made between the negative terminal of the brush and the ground terminal of the connector, but there is also a possibility of the metal plate contacting the housing of the wiper motor or the like. Such contact could result in short circuiting of the wiper motor circuit.

The present disclosure provides a wiper motor capable of effectively blocking a noise component arising accompanying rotation of a wiper motor, while also enabling easy installation of a configuration used to block this noise component.

Solution to Problem

A first aspect of the present disclosure is a wiper motor including an electrically conductive housing in which a speed reduction mechanism is housed, a motor body housed within a yoke joined to the housing and having a power supply terminal that contacts a commutator so as to supply electric power to a rotor, and having a brush that includes a ground terminal having one end in contact with the commutator and another end connected to an electrically conductive partitioning wall of the housing that covers an opening in the yoke, a power supply line configured to supply electric power to the power supply terminal via a noise-suppression choke coil, a ground line connected to the partitioning wall and to ground, and a capacitor connecting the power supply line with the ground line, such that a noise component flowing through the ground line passes through the choke coil.

In the first aspect, a negative terminal of the brush is electrically connected to ground through the yoke and the housing by the ground line connected to the partitioning wall of the housing. Moreover, a high frequency noise component flowing from the negative terminal of the brush can be effectively guided to the noise-suppression choke coil through the capacitor that connects the ground line and the power supply line together. A noise component arising accompanying rotation of the wiper motor can be effectively blocked as a result.

A second aspect of the present disclosure is the wiper motor of the first aspect, wherein the ground line is further connected to an inner wall of the housing between one end of the capacitor and the ground.

In the second aspect, the ground line is further connected to the inner wall of the housing between the one end of the capacitor and the ground. This enables a noise component traveling that has entered the housing to be effectively guided to the capacitor, enabling the noise component arising accompanying rotation of the wiper motor to be effectively blocked as a result.

A third aspect of the present disclosure is the wiper motor of the second aspect, wherein respective locations at which the ground line is connected to the partitioning wall and the inner wall of the housing are electrically conductive and elastic, and are electrically connected to the housing by abutting the partitioning wall and the inner wall of the housing respectively.

In the third aspect, the connecting locations where the ground line is connected to the partitioning wall and the housing inner wall are for example configured from an elastic metal, thereby enabling electrical connectivity between the ground line and the housing to be easily established.

A fourth aspect of the present disclosure is a wiper motor including, an electrically conductive housing in which a speed reduction mechanism is housed, a motor body housed within a yoke joined to the housing and having a power supply terminal that contacts a commutator so as to supply electric power to a rotor, and having a brush that includes a ground terminal having one end in contact with the commutator and another end connected to an electrically conductive partitioning wall of the housing that covers an opening in the yoke, a bulge provided at the partitioning wall so as to retain a bearing of a rotation shaft of the motor body; a power supply line configured to supply electric power to the power supply terminal; and a ground line connected to the bulge and to ground.

In the fourth aspect, the ground line is connected to the bulge provided at the partitioning wall to which the ground terminal of the brush is connected, enabling the distance over which a noise component flows through the housing to be reduced, thus suppressing the noise component from radiating toward the exterior.

A fifth aspect of the present disclosure is the wiper motor of the fourth aspect, wherein the bulge includes a lip configured to anchor a terminal by sandwiching the terminal, and one end of the ground line is formed so as to be anchored to the lip.

In the fifth aspect, the one end of the ground line is anchored to the lip, such that a reliable electrical connection is formed between the ground line and the partitioning wall.

A sixth aspect of the present disclosure is the wiper motor of the fifth aspect, wherein one end of the ground line deforms in a direction intersecting a direction of assembling a housing cover to the housing so as to contact an inside face of the lip.

In the sixth aspect, the one end of the ground line contacts the inside face of the lip while stress acts on the one end so as to deform the one end, such that a reliable electrical connection is formed between the ground line and the partitioning wall.

A seventh aspect of the present disclosure is the wiper motor of the fifth aspect or the sixth aspect, wherein a leading end portion of one end of the ground line is bent so as to contact an inside face of the lip.

In the seventh aspect, the leading end portion of the one end of the ground line is bent so as to contact the inside face of the lip, such that a reliable electrical connection is formed between the ground line and the partitioning wall.

An eighth aspect of the present disclosure is the wiper motor of the fourth aspect or the fifth aspect, wherein one end of the ground line is formed so as to sandwich a side face of the bulge.

In the eighth aspect, the one end of the ground line sandwiches the bulge, such that a reliable electrical connection is formed between the ground line and the partitioning wall.

A ninth aspect of the present disclosure is the wiper motor of the fourth aspect, wherein the bulge includes a protrusion, and one end of the ground line is formed so as to contact an apex portion and a side face of the protrusion.

In the ninth aspect, the one end of the ground line contacts the apex portion and the side face of the protrusion of the bulge, such that a reliable electrical connection is formed between the ground line and the partitioning wall.

A tenth aspect of the present disclosure is the wiper motor of the ninth aspect, wherein one end of the ground line is formed so as to contact part of an apex portion and one side face of the protrusion.

In the tenth aspect, the one end of the ground line contacts part of the apex portion and the one side face of the protrusion, such that a reliable electrical connection is formed between the ground line and the partitioning wall.

An eleventh aspect of the present disclosure is the wiper motor of the ninth aspect or the tenth aspect, wherein the protrusion includes a groove in the apex portion, and the one end of the ground line is formed so as to contact a side face portion of the groove.

In the eleventh aspect, the one end of the ground line contacts the side face portion of the groove, such that a reliable electrical connection is formed between the ground line and the partitioning wall.

DESCRIPTION OF EMBODIMENTS

First Exemplary Embodiment

Figure 1:
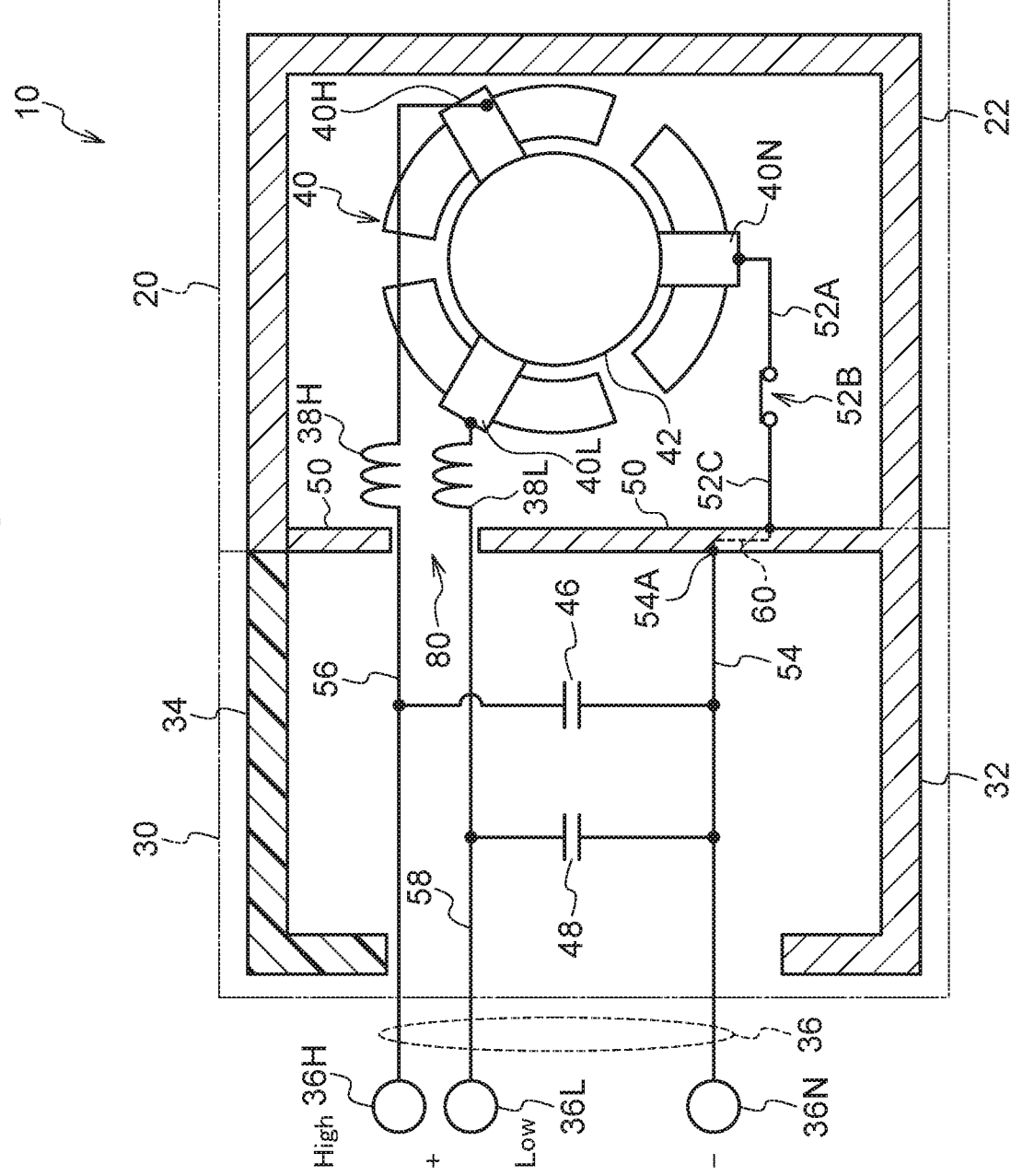
FIG. 1 is block diagram illustrating an example of an electrical configuration of a wiper motor according to a first exemplary embodiment of the present disclosure.

FIG. 1 is a block diagram illustrating an example of an electrical configuration of a wiper motor 10 according to the present exemplary embodiment.

As illustrated in FIG. 1, the wiper motor 10 is configured by a motor section 20 in which a stator and a rotor are housed, and a speed reduction section 30 configured by a worm gear mechanism provided at a terminal end of a rotation shaft of the rotor so as to reduce the rotation speed of the rotation shaft.

The stator and the rotor of the motor section 120 are provided within a yoke 22 configured of die-cast aluminum or the like. The interior of the yoke 22 has a hollow substantially circular cylinder shape, and the stator and the rotor are accommodated in this interior space.

The worm gear mechanism of the speed reduction section 30 mentioned above is accommodated within a die-cast aluminum housing 32. The housing 32 and the worm gear mechanism are covered by a resin housing cover 34.

A connector 36 includes a High terminal 36H, a Low terminal 36L, and a ground terminal 36N. The High terminal 36H supplies electric power to the wiper motor 10 so as to rotate the wiper motor 10 at high speed. The Low terminal 36L supplies electric power to the wiper motor 10 at a lower voltage than the High terminal 36H so as to rotate the wiper motor 10 at a lower speed than the above-mentioned high speed rotation. The ground terminal 36N is electrically connected to a negative terminal 40N of a brush 40 of the wiper motor 10.

The electric power supplied through the High terminal 36H is supplied to a commutator 42 via a high voltage line 56, through a choke coil 38H that removes a noise-causing high frequency component, and a positive terminal 40H of the brush 40. Electric power supplied through the Low terminal 36L is supplied to the commutator 42 via a low voltage line 58, through a choke coil 38L that removes a noise-causing high frequency component, and a positive terminal 40L of the brush 40. The high voltage line 56 and the low voltage line 58 are respectively connected to the positive terminals 40H, 40L through an opening 80 provided in a partitioning wall 50 that partitions the motor section 20 from the speed reduction section 30. Although the motor section 20 includes the rotor and the stator, these are omitted from illustration in FIG. 1. The partitioning wall 50 is integral to the housing 32, and is a location covering an opening in the housing 32 in a state in which the yoke 22 and the housing 32 are joined together. Note that configuration may be made in which one each is provided of a positive charge terminal of the connector 36, a positive terminal of the brush, and a choke coil.

The ground terminal 36N is a terminal connected to ground on a vehicle side, and is electrically connected inside the wiper motor 10 to the negative terminal 40N of the brush 40 through a ground line 54, the partitioning wall 50, this being conductive due to being made of die-cast aluminum or the like, a second connection terminal 52C, a breaker 52B, and a first connection terminal 52A. The ground line 54 is connected to the partitioning wall 50 at an end portion 54A, and the ground terminal 36N, the portion of the partitioning wall 50 illustrated by the broken line 60, the second connection terminal 52C, the breaker 52B, the first connection terminal 52A, and the negative terminal 40N of the brush 40 are electrically connected together. Note that the breaker 52B is a device used to prevent damage to the wiper motor 10 and to circuits of the wiper motor 10 by breaking the electrical circuit when a coil current (motor current) in the wiper motor 10 becomes excessive.

The ground line 54 and the high voltage line 56 are connected together through a noise-prevention capacitor 46. The ground line 54 and the low voltage line 58 are connected together through a noise-prevention capacitor 48. One end of the capacitor 46 is connected between the choke coil 38H of the high voltage line 56 and the High terminal 36H of the connector 36, and the other end of the capacitor 46 is connected between the end portion 54A of the ground line 54 and the ground terminal 36N of the connector 36. One end of the capacitor 48 is connected between the choke coil 38L of the low voltage line 58 and the Low terminal 36L of the connector 36, and the other end of the capacitor 48 is connected between the end portion 54A of the ground line 54 and the ground terminal 36N of the connector 36.

A high frequency noise component is generated by rotation of the wiper motor 10. This noise component passes from the negative terminal 40N of the brush 40 through the first connection terminal 52A, the breaker 52B, and the second connection terminal 52C, then passes through the partitioning wall 50 as illustrated by the broken line 60 in FIG. 1, and passes through the end portion 54A and along the ground line 54.

The noise-prevention capacitors 46, 48 do not allow direct current to pass, but do allow alternating current to pass. Accordingly, the noise component from the electric potential fluctuating at high frequency is guided to the choke coil 38H through the capacitor 46. The noise component is also guided to the choke coil 38L through the capacitor 48.

The choke coils 38H, 38L are high inductance elements, and exhibit high impedance with respect to the high frequency noise component. Accordingly, the noise component is blocked by the choke coils 38H, 38L. Even supposing the blocking of the noise component by the choke coils 38H, 38L were insufficient, the noise component would be supplied to the wiper motor 10 through the positive terminals 40H, 40L, and would be eliminated with the electric power used to rotate the wiper motor 10.

Figure 9:
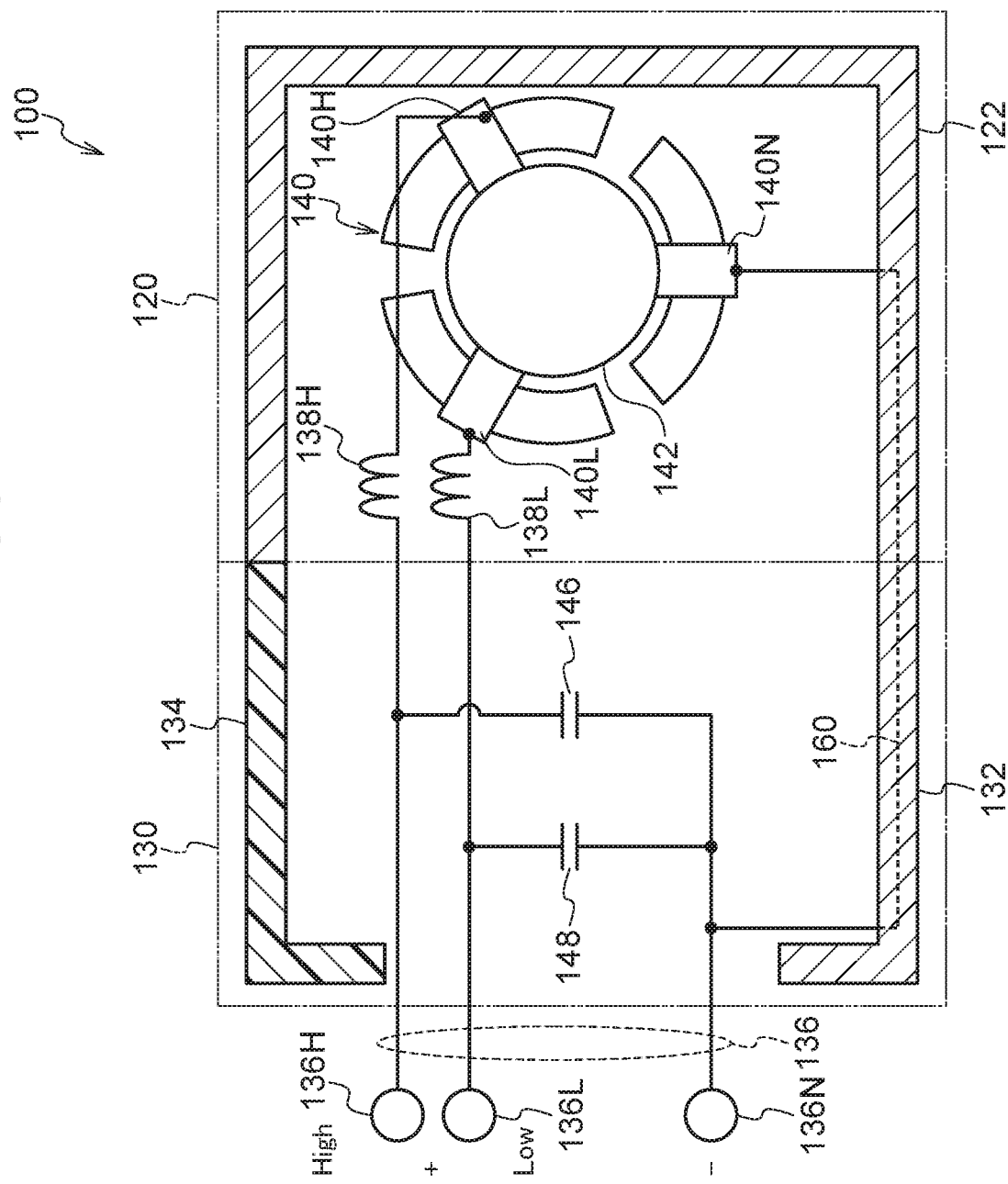
FIG. 9 is a block diagram illustrating an example of an electrical configuration of a typical wiper motor.

As illustrated in FIG. 1, in the present exemplary embodiment the noise component is guided into the ground line 54 through the first connection terminal 52A, the breaker 52B, and the second connection terminal 52C. Accordingly, as illustrated by the broken line 60 in FIG. 1, the distance over which the noise component travels through the partitioning wall 50 configuring part of the housing 32 of the wiper motor 10 is shorter than that in the wiper motor 100 illustrated in FIG. 9. The noise component also passes more readily through the first connection terminal 52A, the breaker 52B, the second connection terminal 52C, and the ground line 54 to the noise-prevention capacitors 46, 48, with the result that the noise component is reduced more than in the wiper motor 100 illustrated in FIG. 9.

Figure 2:
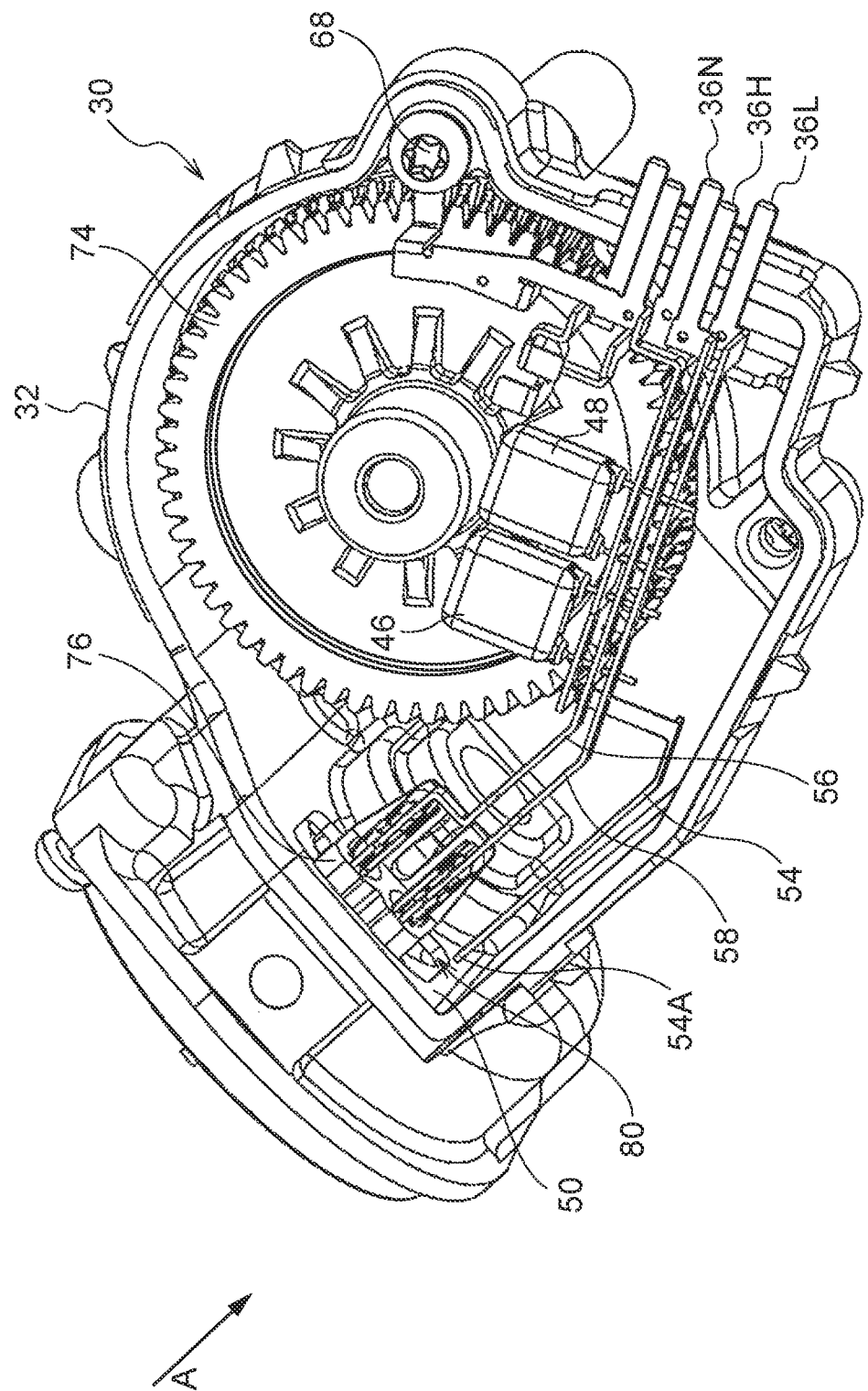
FIG. 2 is a schematic diagram illustrating an example of a speed reduction section in a state in which a housing cover has been removed from a wiper motor according to the first exemplary embodiment of the present disclosure.

FIG. 2 is a schematic diagram illustrating an example of the speed reduction section 30 of the wiper motor 10 according to the present exemplary embodiment in a state in which the housing cover 34 has been removed. Normally, the housing cover 34 would be joined to the housing 32 by a fixing member such as a fixing bolt 68 so as to cover the interior of the housing 32.

A worm wheel 74 to reduce the rotation speed of the wiper motor 10 is housed in the interior of the housing 32 of the speed reduction section 30 from which the housing cover 34 has been removed. A circuit including the High terminal 36H and the high voltage line 56, the Low terminal 36L and the low voltage line 58, the ground terminal 36N and the ground line 54, and the capacitors 46, 48 is configured so as to straddle the worm wheel 74. The high voltage line 56, the low voltage line 58, and the ground line 54 illustrated in FIG. 2 are each configured from a rigid metal wire or a metal sheet.

The high voltage line 56 and the low voltage line 58 are respectively connected to the positive terminals 40H, 40L of the brush 40 through the opening provided in the partitioning wall 50. Since the partitioning wall 50 is electrically conductive, the high voltage line 56 and the low voltage line 58 pass through the opening in the partitioning wall 50 in a state covered by an insulating member 76.

As illustrated in FIG. 2, the ground line 54 is electrically connected to the partitioning wall 50 through the end portion 54A. The end portion 54A is electrically conductive and elastic, such that the ground line 54 may be electrically connected to the partitioning wall 50 by the end portion 54A abutting the partitioning wall 50. Alternatively, the end portion 54A may be fixed to the partitioning wall 50 using a fixing member such as a bolt in order to establish a reliable connection.

Figure 3:
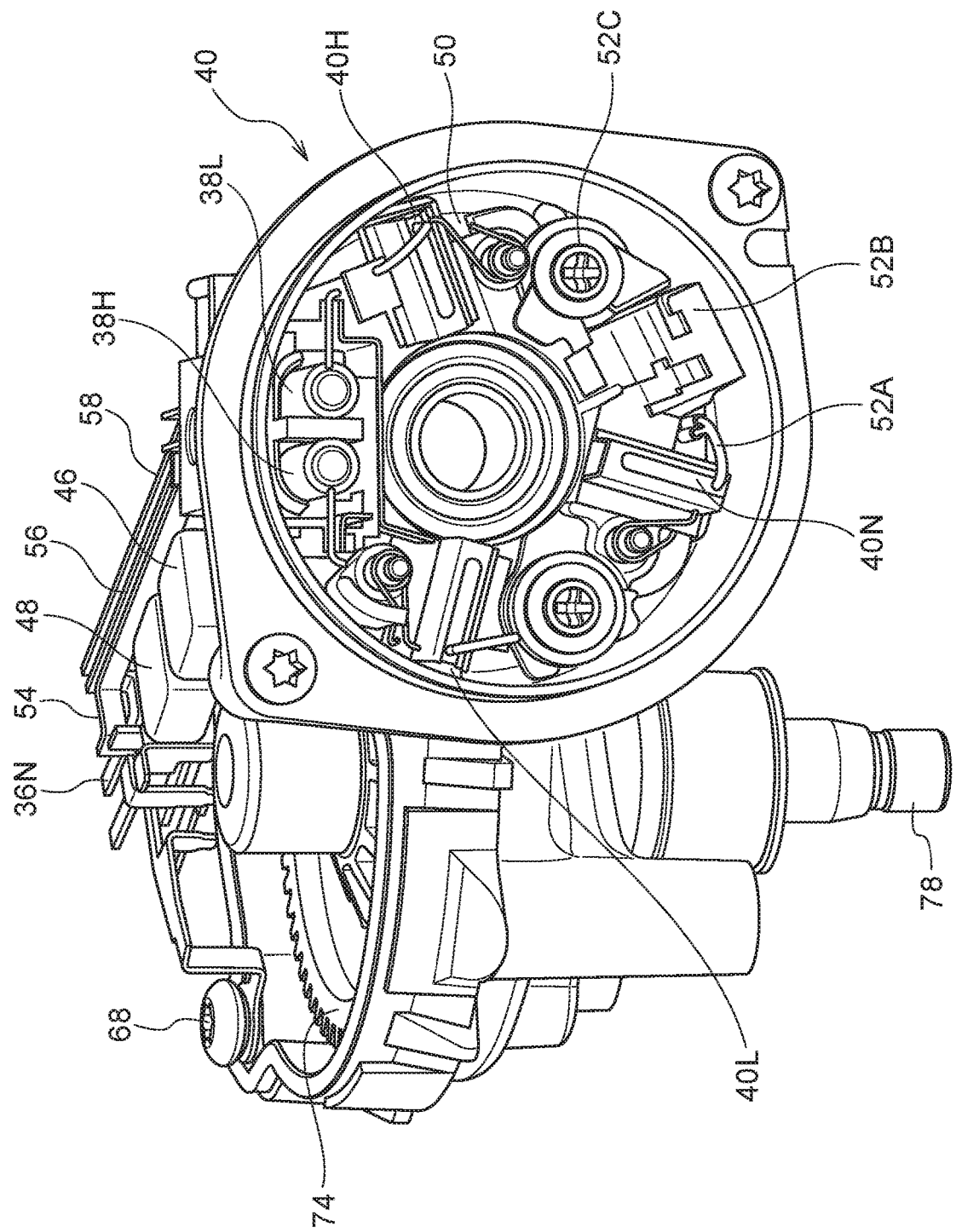
FIG. 3 is a schematic diagram illustrating an example of the speed reduction section of the wiper motor according to the first exemplary embodiment of the present disclosure as viewed along the direction of arrow A in FIG. 2.

FIG. 3 is a schematic diagram illustrating an example of the speed reduction section 30 of the wiper motor 10 according to the present exemplary embodiment as viewed along the direction of arrow A in FIG. 2. FIG. 3 illustrates a configuration of the brush 40 in a state in which the yoke 22, the rotor, and the stator have been removed. FIG. 3 also illustrates an output shaft 78 provided coaxially to the worm wheel 74 of the speed reduction section 30. An end portion of the output shaft 78 is connected to a link mechanism or the like of a wiper device.

The positive terminals 40H, 40L and the negative terminal 40N configuring the brush 40 contact the commutator 42 (not illustrated in FIG. 3) of the wiper motor 10, and supply electric power to the rotor. As illustrated in FIG. 3, the first connection terminal 52A is connected to the negative terminal 40N. The first connection terminal 52A is connected to the breaker 52B. The breaker 52B is connected to the partitioning wall 50 through the second connection terminal 52C.

Figure 4:
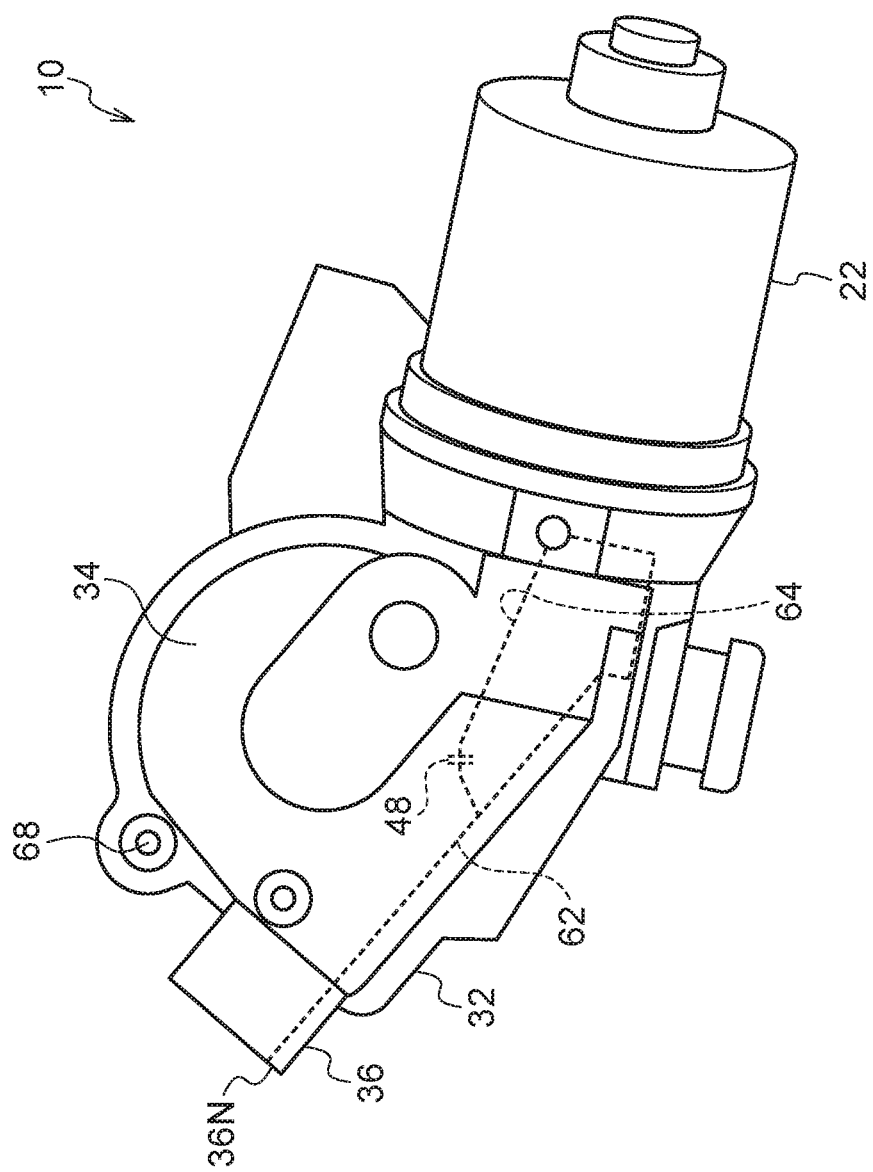
FIG. 4 is a schematic diagram illustrating a wiper motor according to the first exemplary embodiment of the present disclosure.

FIG. 4 is a schematic diagram illustrating the wiper motor 10 according to the present exemplary embodiment. Part of a noise component generated by the rotation of the wiper motor 10 flows toward the ground terminal 36N through the ground line 54 as illustrated by a broken line 62 in FIG. 4, while the noise component is also for example guided into the choke coil 38L through the capacitor 48, as illustrated by a broken line 64. The noise component is effectively eliminated as a result, thus suppressing the noise component from radiating toward the exterior.

As described above, in the present exemplary embodiment, the installation of a circuit that includes the noise-prevention capacitors 46, 48 and that electrically connects the connector 36 and the brush 40 together shortens the distance over which the noise component flows through the partitioning wall 50, and also guides the noise component to the noise-prevention capacitors 46, 48, thereby suppressing the noise component from radiating toward the exterior.

Second Exemplary Embodiment

Figure 5:
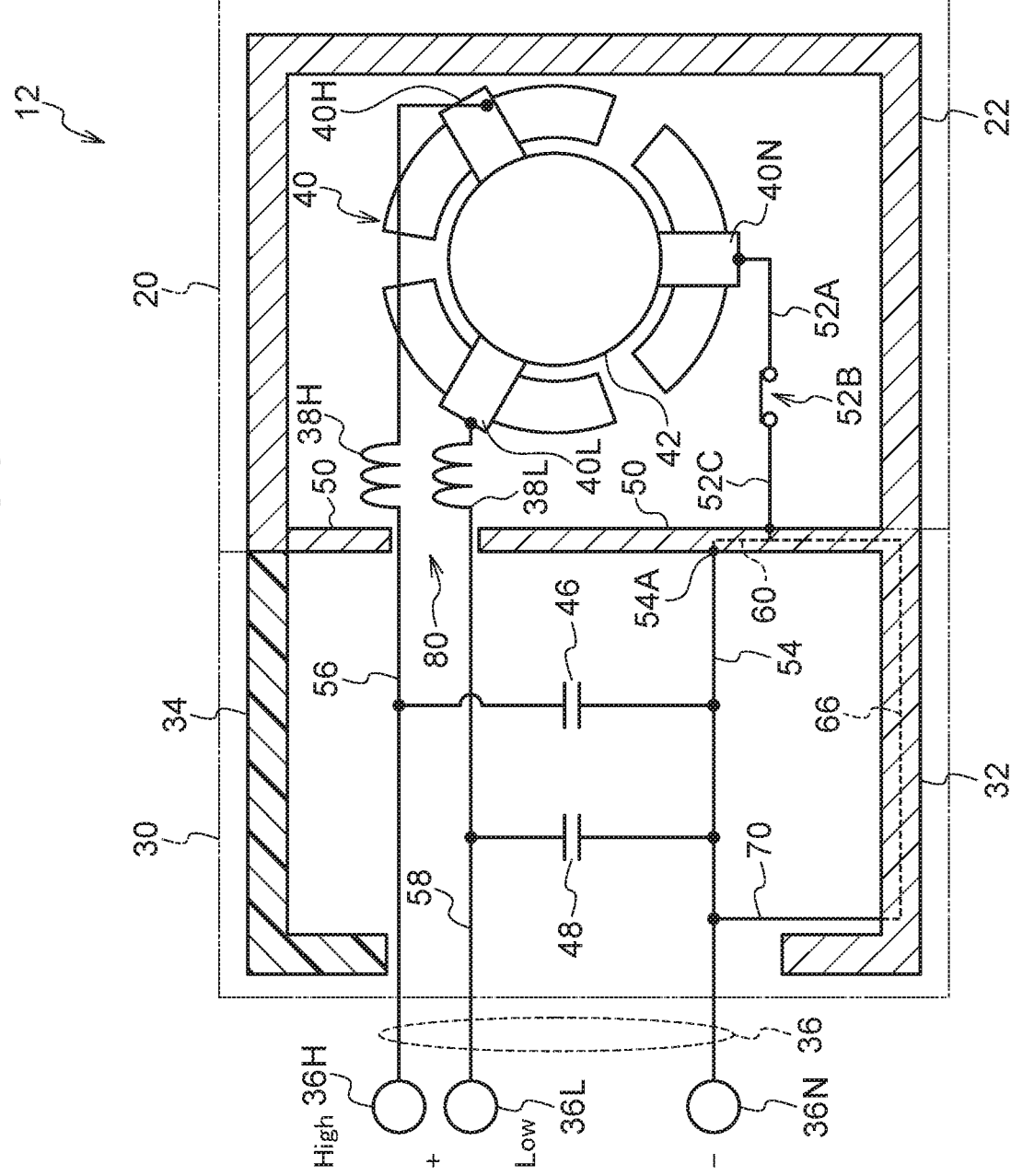
FIG. 5 is a block diagram illustrating an example of an electrical configuration of a wiper motor according to a second exemplary embodiment of the present disclosure.

Explanation follows regarding a second exemplary embodiment of the present disclosure. As illustrated in FIG. 5, a wiper motor 12 according to the present exemplary embodiment differs from the first exemplary embodiment in the point that a third connection terminal 70 is provided. In other respects, configuration is similar to that of the first exemplary embodiment, and so detailed explanation of other configurations will be omitted.

As illustrated in FIG. 5, one end of the third connection terminal 70 is electrically connected to the ground line 54 between the other end of the capacitor 48 and the ground terminal 36N of the connector 36, and the other end of the third connection terminal 70 is electrically connected to an inner wall of the housing 32. As a result, a noise component flows from the negative terminal 40N of the brush 40 to the third connection terminal 70 through a pathway through the partitioning wall 50 and the housing 32, as illustrated by a broken line 66. Similarly to in the first exemplary embodiment, the noise component also flows to the end portion 54A of the ground line 54 through a pathway in the partitioning wall 50 as illustrated by the broken line 60. This results in the noise component passing through the capacitors 46, 48 to the choke coils 38H, 38L and being eliminated. Part of the noise component is also guided through the ground terminal 36N to ground in the vehicle.

In the present exemplary embodiment, although the distance over which the noise component travels through the structure of the wiper motor 10 (through the partitioning wall 50) is longer than in the first exemplary embodiment, the third connection terminal 70 facilitates the flow of the noise component into the ground line 54 to which the noise-prevention capacitors 46, 48 are connected.

Figure 6:
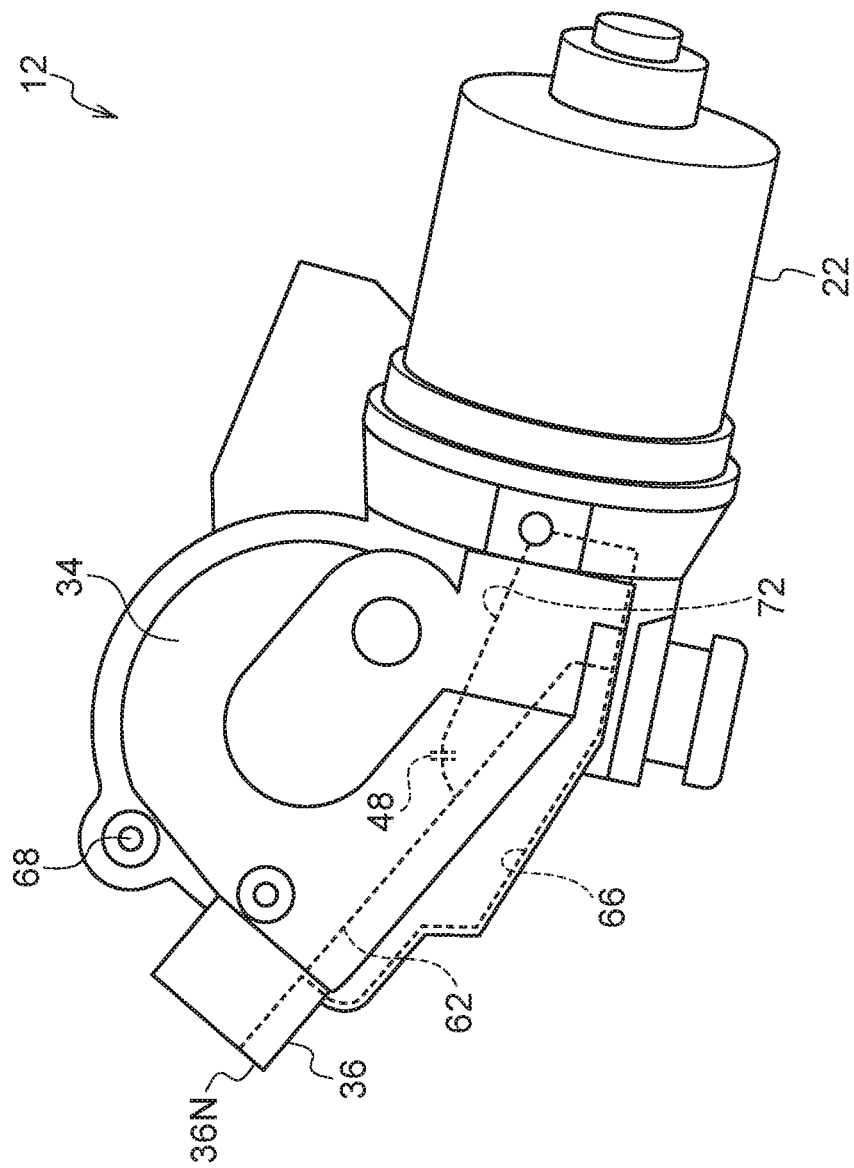
FIG. 6 is a schematic diagram illustrating a wiper motor according the second exemplary embodiment of the present disclosure.

FIG. 6 is a schematic diagram illustrating the wiper motor 12 according to the present exemplary embodiment. As illustrated by the broken line 66 in FIG. 6, part of the noise component generated by the rotation of the wiper motor 12 flows through the housing 32 toward the ground terminal 36N, while the remaining noise component is, for example, guided through the capacitor 48 to the choke coil 38L, as illustrated by a broken line 72. This results in the noise component being effectively eliminated, suppressing the noise component from radiating toward the exterior. Note that a location of the third connection terminal 70 connected to the inner wall of the housing 32 is electrically conductive and elastic, such that an electrical connection with the housing may be formed by the location abutting the inner wall of the housing 32. Alternatively, the third connection terminal 70 may be fixed to the inner wall of the housing 32 using a fixing member such as a bolt.

Figure 7:
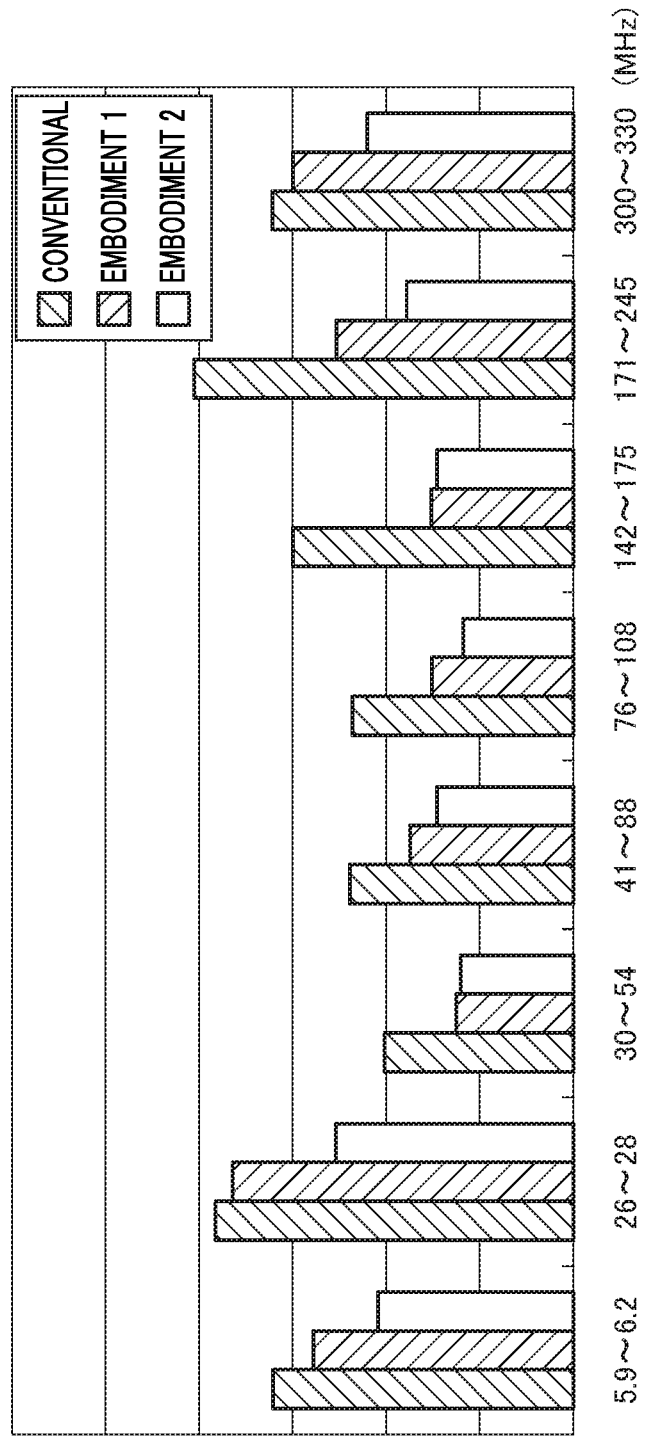
FIG. 7 is a graph illustrating an example of noise radiation reduction effects of the first exemplary embodiment of the present disclosure and the second exemplary embodiment of the present disclosure.
Figure 8:
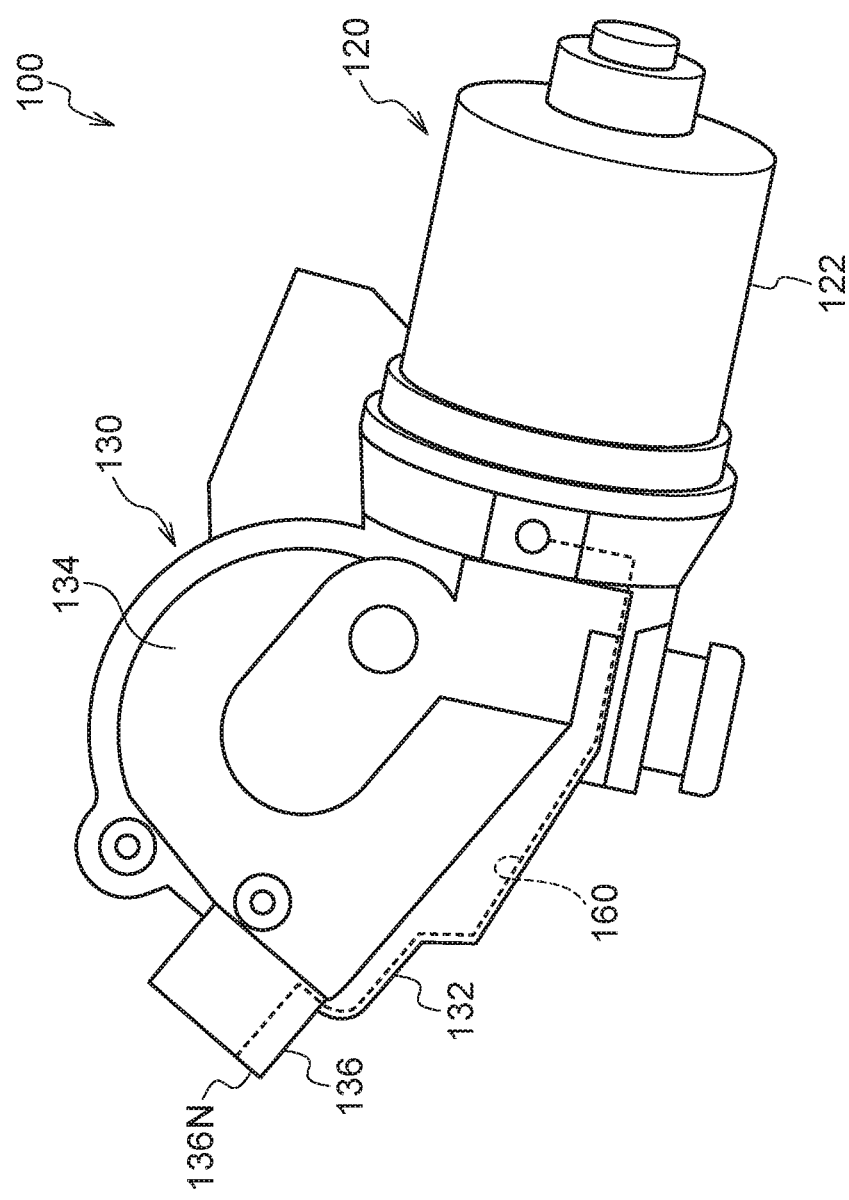
FIG. 8 is a schematic diagram illustrating a typical wiper motor.

FIG. 7 is a graph illustrating an example of the noise radiation reduction effects of the present exemplary embodiment (Embodiment 2) and the first exemplary embodiment (Embodiment 1). As illustrated in FIG. 7, the present exemplary embodiment exhibits the clearest noise reduction effect from low frequency components through to high frequency components.

As described above, in the present exemplary embodiment, the installation of a circuit that includes the noise-prevention capacitors 46, 48 and in which the connector 36 and the brush 40 are electrically connected together, as well as the use of the third connection terminal 70 to guide the noise component flowing in the housing 32 to the noise-prevention capacitors 46, 48, suppress the noise component from radiating toward the exterior.

Third Exemplary Embodiment

Explanation follows regarding a third exemplary embodiment of the present disclosure. In the present exemplary embodiment, configurations equivalent to those of the first exemplary embodiment or the second exemplary embodiment are allocated the same reference numerals, and detailed explanation thereof is omitted.

Figure 10:
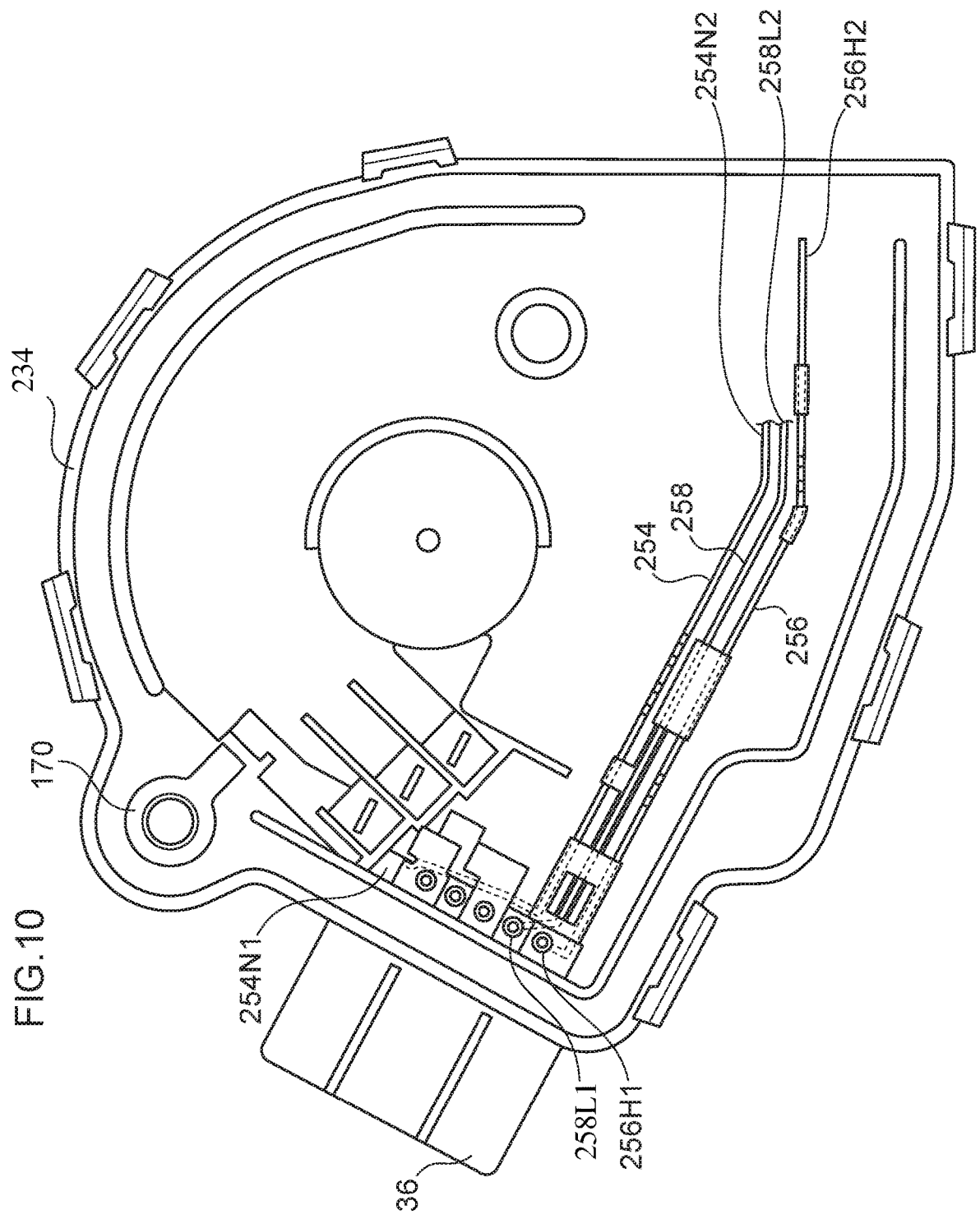
FIG. 10 is a schematic diagram illustrating the inside of a housing cover (the side on which a speed reduction mechanism of the wiper motor is accommodated) according to a third exemplary embodiment of the present disclosure.

As illustrated in FIG. 10, in a wiper motor according to the present exemplary embodiment, a ground line 254, a high voltage line 256, and a low voltage line 258 are installed inside a resin housing cover 234 (on the side in which a speed reduction mechanism of the wiper motor is accommodated).

One end 256H1 of the high voltage line 256 is connected to the High terminal 36H (see FIG. 2) of the connector 36, and one end 258L1 of the low voltage line 258 is connected to the Low terminal 36L (see FIG. 2) of the connector 36. One end 254N1 of the ground line 254 is connected to the ground terminal 36N of the connector 36, and extends as far as a fixing bolt connection point 170. The fixing bolt connection point 170 makes contact with the fixing bolt 68 when the housing cover 234 is joined to the housing, such that the ground line 254 and the housing are electrically connected together through the fixing bolt 68.

The other end 256H2 of the high voltage line 256 and the other end 258L2 of the low voltage line 258 form terminals projecting out so as to form an electrical connection with the positive terminals 40H, 40L of the brush 40. The other end 254N2 of the ground line 254 configures a terminal that is electrically connected to a bulging location (referred to hereafter as a "bulge"), provided so as to cover a bearing of a rotation shaft of the wiper motor on the side of the housing on which the speed reduction mechanism is accommodated, when the housing cover 234 is joined to the housing 232.

Figure 11A:
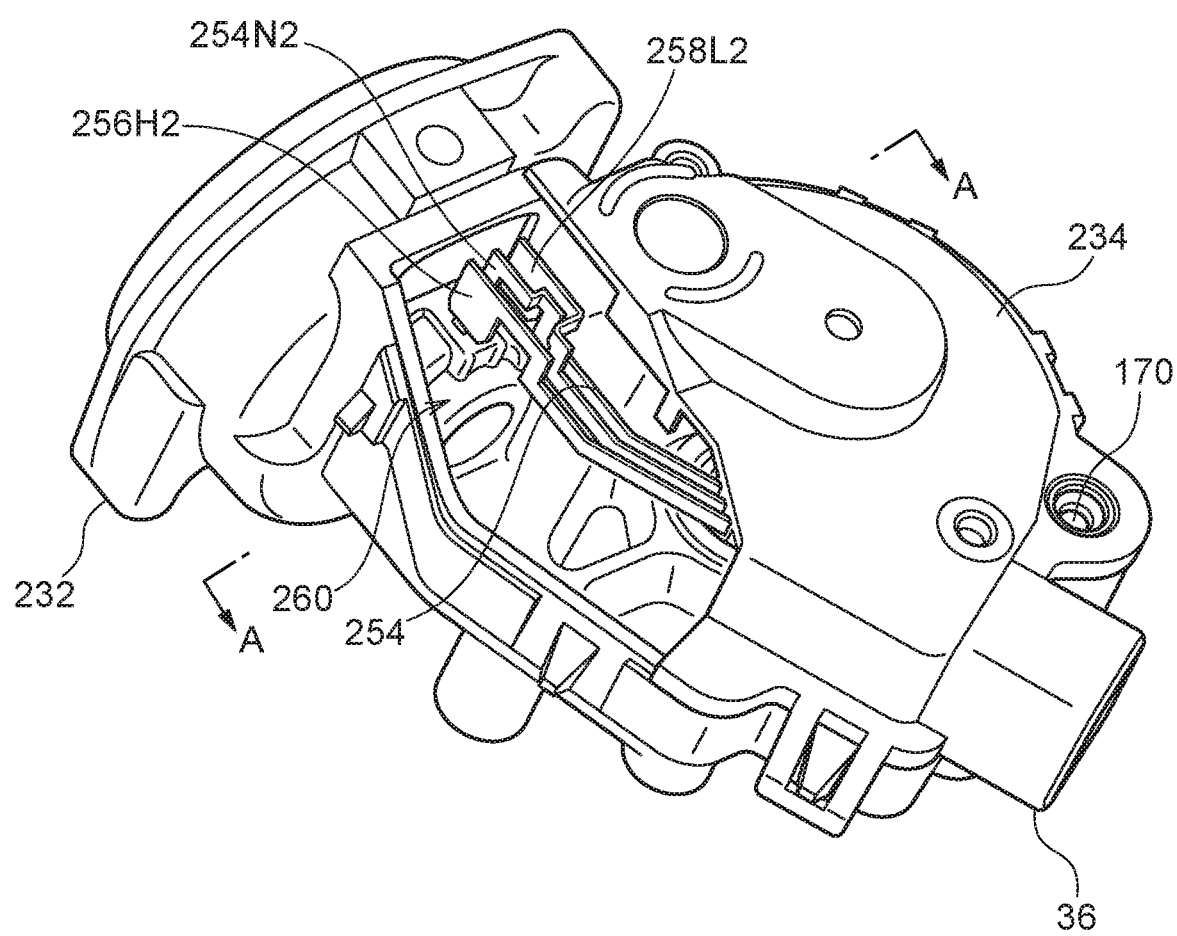
FIG. 11A is a perspective view illustrating a housing cover when joined to housing of a wiper motor according to the third exemplary embodiment of the present disclosure.
Figure 11B:
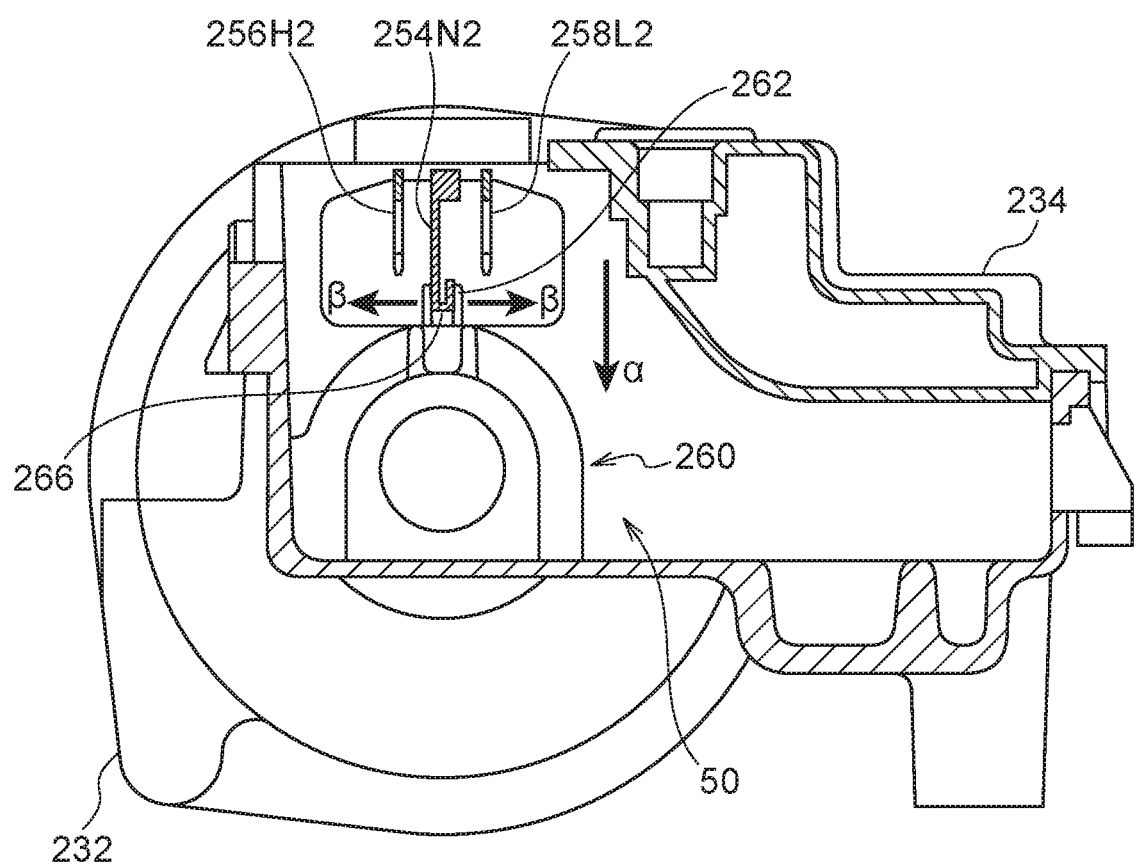
FIG. 11B is a cross-section illustrating the housing with the housing cover joined thereto, as sectioned along line A-A in FIG. 11A.

FIG. 11A is a perspective view illustrating the housing cover 234 when joined to housing 232 of the wiper motor according to the present exemplary embodiment. FIG. 11B is a cross-section of the housing 232 with the housing cover 234 joined thereto, as sectioned along line A-A in FIG. 11A. As illustrated in FIG. 11A, the other end 254N2 of the ground line 254 contacts an upper end portion of a bulge 260 that covers the bearing of the rotation shaft of the wiper motor. The bulge 260 is manufactured from die-cast aluminum cast integrally with the partitioning wall 50 of the housing 232, and is electrically connected to the negative terminal 40N (see FIG. 3) of the brush 40.

As illustrated in FIG. 11B, the other end 254N2 of the ground line 254 is electrically connected to a lip 262 provided at the upper end portion of the bulge 260. The lip 262 is formed by two parallel thin sheet shaped members. When the housing cover 234 is being joined to the housing 232, the other end 254N2 of the ground line 254 is inserted between and anchored to the two sheet shaped members. A leading end portion 266 of the other end 254N2 of the ground line 254 is bent so as to contact an inside face of the lip 262, and when the housing cover 234 is joined to the housing 232 along an assembly direction α, the housing cover 234 flexes in a flexing direction β substantially orthogonal to the assembly direction α. This results in a side face portion of the other end 254N2 abutting the sheet shaped members of the lip 262, thereby forming a reliable electrical connection between the other end 254N2 and the lip 262. Moreover, a gap is provided between a base portion of an inner face of the lip 262 and the leading end portion 266 of the other end 254N2. This gap is provided in order to prevent the leading end portion 266 of the other end 254N2 hitting an inner base portion of the lip 262, resulting in a detrimental effect on the join between the housing 232 and the housing cover 234.

The lip 262 may be configured as a separate component to the housing 232 and fixed to the upper end portion of the bulge 260 of the housing 232 using electric welding or an electrically conductive adhesive. However, in the present exemplary embodiment, the lip 262 is integrally cast to the housing 232 by being die cast together with the bulge 260. Alternatively, the lip 262 may be configured by being integrally cast to the housing 232 by being die cast together with the bulge 260 as a single protrusion at the upper end portion of the bulge 260, and then forming two thin sheet shaped members by machining after casting.

As described above, the negative terminal 40N of the brush 40 is electrically connected to the partitioning wall 50 that is cast integrally with the bulge 260, and the other end 254N2 of the ground line 254 is made to contact the bulge 260. This enables the ground line 254 to be electrically connected in the close vicinity of the negative terminal 40N of the brush 40, thus enabling the distance over which the noise component travels through the housing 232 from the negative terminal 40N of the brush 40 to the ground line 254 to be made shorter.

As described above, in the present exemplary embodiment, the distance over which the noise component flows through the housing 232 is shorter than in the first exemplary embodiment and the second exemplary embodiment, thereby suppressing the noise component from radiating toward the exterior.

Moreover, in the present exemplary embodiment, when joining the housing 232 and the housing cover 234 together, the leading end portion 266 of the other end 254N2 is first abutted against the inside of the lip 262, and then the other end 254N2 is attached along the inside of the lip 262 such that the other end 254N2 of the ground line 254 attached to the housing cover 234 acts as an assembly guide for the housing cover 234.

Fourth Exemplary Embodiment

Explanation follows regarding a fourth exemplary embodiment of the present disclosure. In the present exemplary embodiment, configurations equivalent to those of the first to third exemplary embodiments are allocated the same reference numerals, and detailed explanation thereof is omitted.

Figure 12A:
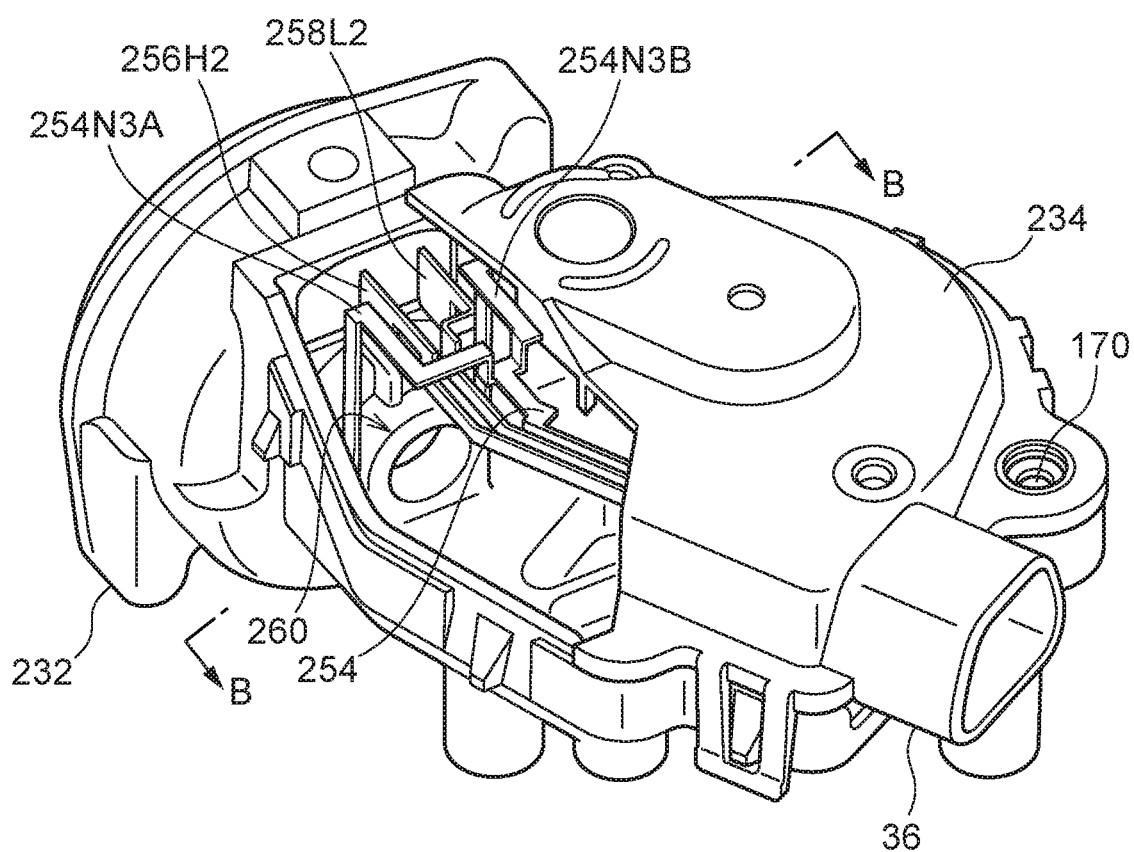
FIG. 12A is a perspective view illustrating a housing cover when joined to housing of a wiper motor according to a fourth exemplary embodiment of the present disclosure.
Figure 12B:
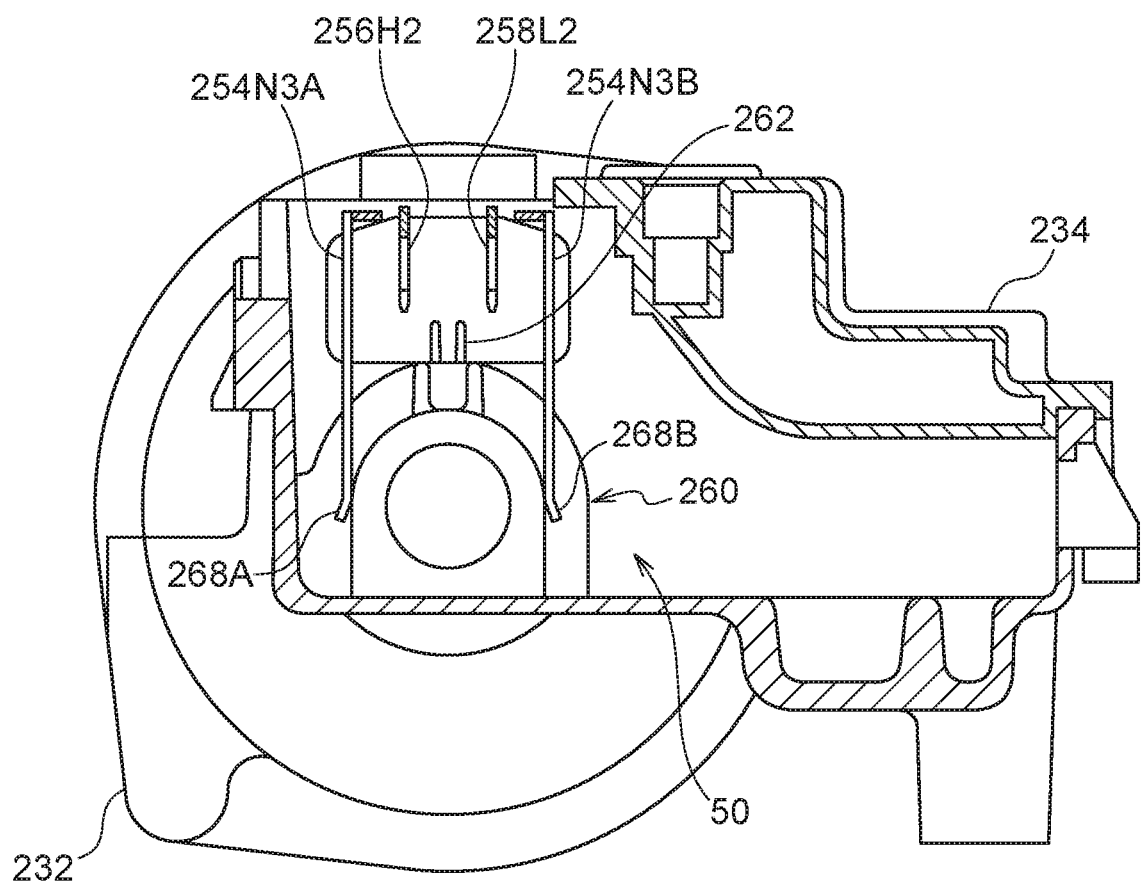
FIG. 12B is a cross-section illustrating the housing with the housing cover joined thereto, as sectioned along line B-B in FIG. 12A.

FIG. 12A is a perspective view illustrating a housing cover 234 when joined to housing 232 of a wiper motor according to the present exemplary embodiment. FIG. 12B is a cross-section of the housing 232 with the housing cover 234 joined thereto as, sectioned along line B-B in FIG. 12A. As illustrated in FIG. 12A, the ground line 254 includes other ends 254N3A, 254N3B. The other ends 254N3A, 254N3B respectively contact side face portions of the bulge 260. As illustrated in FIG. 12B, the other ends 254N3A, 254N3B of the ground line 254 are electrically connected to the bulge 260 such that the side face portions of the bulge 260 are sandwiched between the other ends 254N3A, 254N3B. In the present exemplary embodiment, there is no need to form the lip 262, which requires detailed processing of the bulge 260. Not forming the lip 262 enables a reduction in the manufacturing cost of the housing 232 in comparison to the third exemplary embodiment. As illustrated in FIG. 12B, leading end portions 268A, 268B of the other ends 254N3A, 254N3B spread toward the outside with respect to the bulge 260 so as to fit over the bulge 260 easily during assembly of the housing cover 234 to the housing 232.

As described above, the negative terminal 40N of the brush 40 is electrically connected to the partitioning wall 50 that is cast integrally with the bulge 260, enabling the ground line 254 to be electrically connected in the close vicinity of the negative terminal 40N of the brush 40 by making the other ends 254N3A, 254N3B of the ground line 254 contact the side face portions of the bulge 260. This enables the distance over which the noise component travels through the housing 232 from the negative terminal 40N of the brush 40 to the ground line 254 to be made shorter.

As described above, in the present exemplary embodiment, the distance over which the noise component flows through the housing 232 is shorter than in the first exemplary embodiment and the second exemplary embodiment, thereby suppressing the noise component from radiating toward the exterior.

Moreover, since the other ends 254N3A, 254N3B abut the side face portions of the bulge 260 such that the bulge 260 is sandwiched between the other ends 254N3A, 254N3B, the surface area of the electrical contact between the ground line 254 and the housing 232 can be made larger than in the third exemplary embodiment, thereby enabling a more reliable connection to be formed between the ground line 254 and the housing 232.

Moreover, in the present exemplary embodiment, when joining the housing 232 and the housing cover 234 together, the leading end portions 268A, 268B of the other ends 254N3A, 254N3B contact the side faces of the bulge 260 first when attaching the other ends 254N3A, 254N3B along the side faces of the bulge 260, such that the other ends 254N3A, 254N3B of the ground line 254 attached to the housing cover 234 act as assembly guides for the housing cover 234.

Fifth Exemplary Embodiment

Explanation follows regarding a fifth exemplary embodiment of the present disclosure. In the present exemplary embodiment, configurations equivalent to those of the first to fourth exemplary embodiments are allocated the same reference numerals, and detailed explanation thereof is omitted.

Figure 13A:
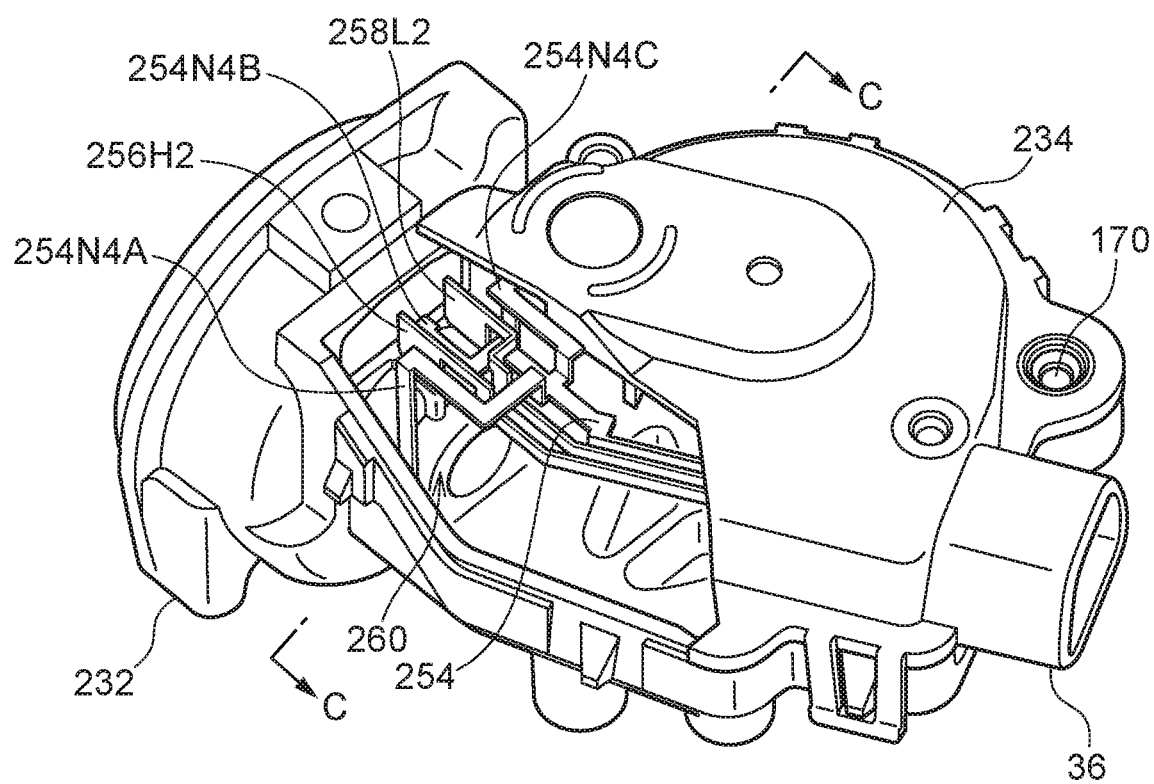
FIG. 13A is a perspective view illustrating a housing cover when joined to housing of a wiper motor according to a fifth exemplary embodiment of the present disclosure.
Figure 13B:
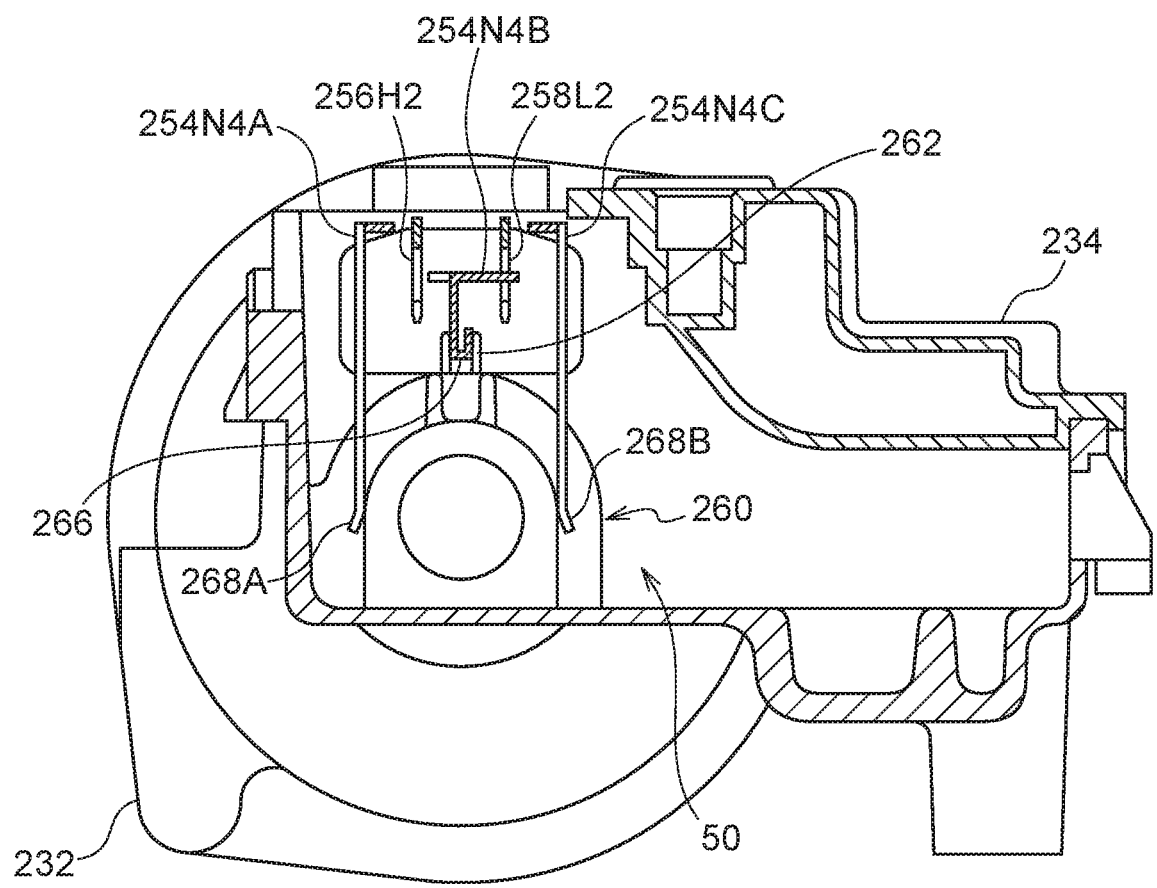
FIG. 13B is a cross-section illustrating the housing with the housing cover joined thereto, as sectioned along line C-C in FIG. 13A.

FIG. 13A is a perspective view illustrating a housing cover 234 when joined to housing 232 of a wiper motor according to the present exemplary embodiment. FIG. 13B is a cross-section of the housing 232 with the housing cover 234 thereto, as sectioned along line C-C in FIG. 13A. As illustrated in FIG. 13A, the ground line 254 includes other ends 254N4A, 254N4B, and 254N4C. The other ends 254N4A, 254N4C respectively contact side face portions of the bulge 260, similarly to in the fourth exemplary embodiment, and the other end 254N4B is anchored to a lip 262 at the upper end portion of the bulge 260, similarly to in the third exemplary embodiment.

As described above, the negative terminal 40N of the brush 40 is electrically connected to the partitioning wall 50 cast integrally with the bulge 260, such that making the other ends 254N4A, 254N4B, 254N4C of the ground line 254 contact the bulge 260 enables the ground line 254 to be electrically connected in the close vicinity of the negative terminal 40N of the brush 40. This enables the distance over which the noise component travels through the housing 232 from the negative terminal 40N of the brush 40 to the ground line 254 to be made shorter.

As described above, in the present exemplary embodiment, the distance over which the noise component flows through the housing 232 is shorter than in the first exemplary embodiment and the second exemplary embodiment, thereby suppressing the noise component from radiating toward the exterior.

Moreover, in the present exemplary embodiment, when joining the housing 232 and the housing cover 234 together, since a leading end portion 266 of the other end 254N4B abuts the inside of the lip 262, and leading end portions 268A, 268B of the other ends 254N4A, 254N4C contact the side faces of the bulge 260 first, the other ends 254N4A, 254N4B, 254N4C of the ground line 254 attached to the housing cover 234 act as assembly guides for the housing cover 234.

Moreover, the other ends 254N4A, 254N4C abut the side face portions of the bulge 260 such that the bulge 260 is sandwiched between the other ends 254N4A, 254N4C, and the other end 254N4B is anchored to the lip at the upper end portion of the bulge 260. This enables the number of locations of electrical contact between the ground line 254 and the housing 232 to be increased, and enables the contact surface area to be increased, compared to the fourth exemplary embodiment, thereby enabling a reliable connection to be formed between the ground line 254 and the housing 232.

Sixth Exemplary Embodiment

Explanation follows regarding a sixth exemplary embodiment of the present disclosure. In the present exemplary embodiment, configurations equivalent to those of the first to fifth exemplary embodiments are allocated the same reference numerals, and detailed explanation thereof is omitted.

Figure 14A:
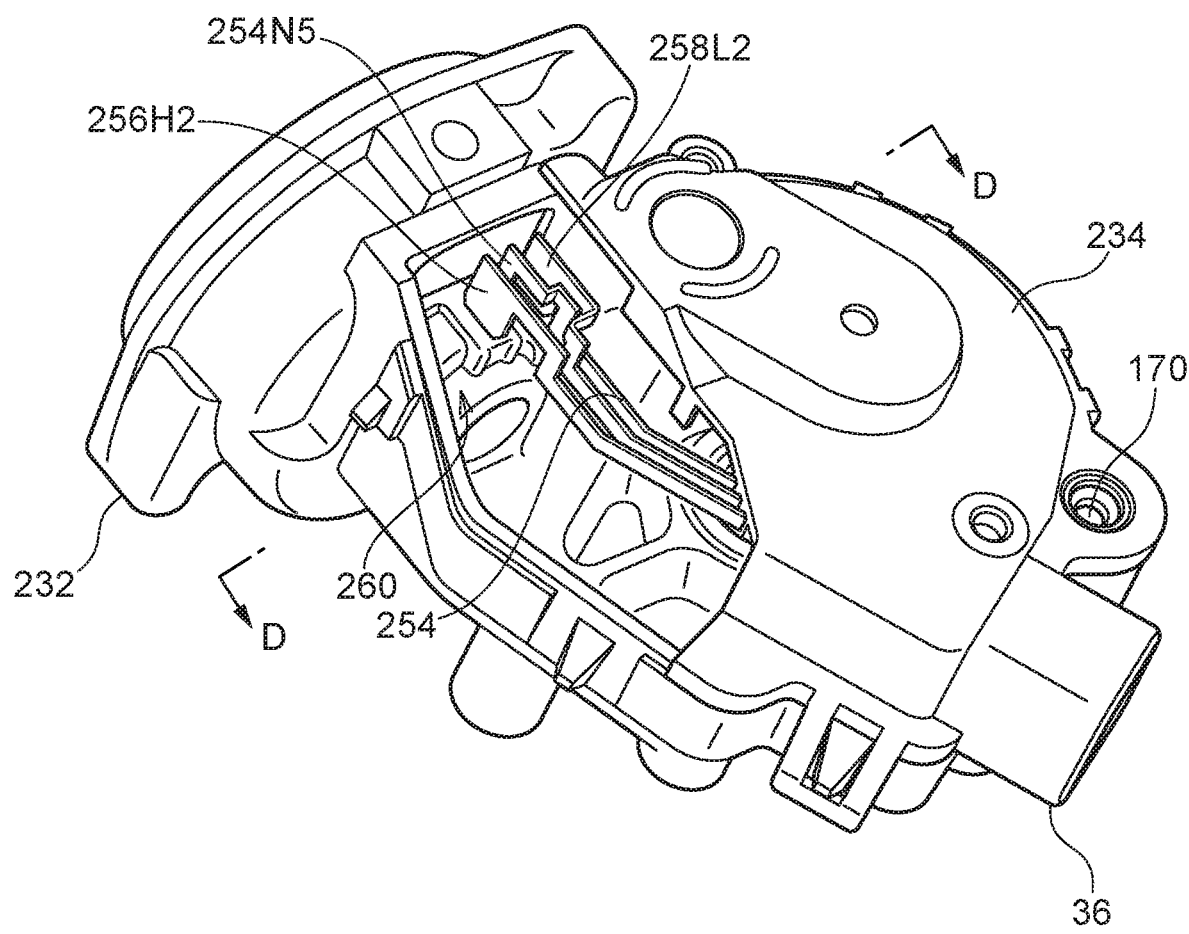
FIG. 14A is a perspective view illustrating a housing cover when joined to housing of a wiper motor according to a sixth exemplary embodiment of the present disclosure.
Figure 14B:
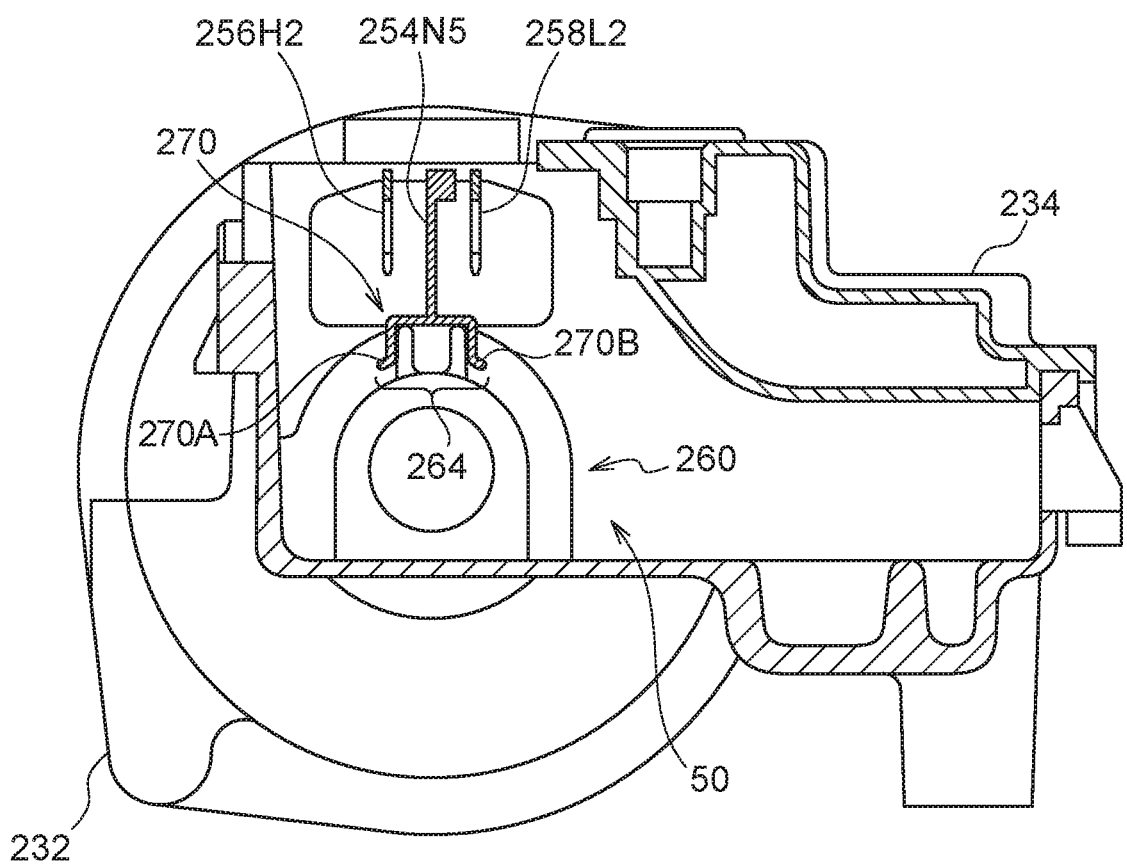
FIG. 14B is a cross-section illustrating the housing with the housing cover joined thereto, as sectioned along line D-D in FIG. 14A.

FIG. 14A is a perspective view illustrating a housing cover 234 when joined to housing 232 of a wiper motor according to the present exemplary embodiment. FIG. 14B is a cross-section of the housing 232 with the housing cover 234 joined thereto, as sectioned along line D-D in FIG. 14A. As illustrated in FIG. 14A, the ground line 254 includes an other end 254N5. The other end 254N5 is electrically connected to an upper end portion 264 configuring a protrusion on the bulge 260.

A leading end portion 270 of the other end 254N5 of the ground line 254 is formed so as to cover the upper end portion 264 of the bulge 260, forming a reliable electrical connection with the upper end portion 264. Terminal ends 270A, 270B of the leading end portion 270 of the other end 254N5 of the ground line 254 spread toward the outside with respect to the upper end portion 264 so as to fit over the upper end portion 264 easily during assembly of the housing cover 234 to the housing 232.

As described above, the negative terminal 40N of the brush 40 is electrically connected to the partitioning wall 50 that is cast integrally with the bulge 260, and the other end 254N5 of the ground line 254 contacts so as to cover the upper end portion 264 of the bulge 260, thereby enabling the ground line 254 to be electrically connected in the close vicinity of the negative terminal 40N of the brush 40. This enables the distance over which the noise component travels through the housing 232 from the negative terminal 40N of the brush 40 to the ground line 254 to be made shorter.

As described above, in the present exemplary embodiment, the distance over which the noise component flows through the housing 232 is shorter than in the first exemplary embodiment and the second exemplary embodiment, thereby suppressing the noise component from radiating toward the exterior.

Forming the leading end portion 270 of the other end 254N5 of the ground line 254 so as to cover the upper end portion 264 of the bulge 260 enables a reliable connection to be formed between the ground line 254 and the housing 232.

In the present exemplary embodiment, there is no need to form the lip 262, which requires detailed processing, enabling the manufacturing cost of the housing 232 to be reduced in comparison to the third exemplary embodiment and so on.

Moreover, in the present exemplary embodiment, the terminal ends 270A, 270B of the leading end portion 270 of the other end 254N5 of the ground line 254 spread toward the outside with respect to the upper end portion 264, and the terminal ends 270A, 270B of the leading end portion 270 of the other end 254N5 of the ground line 254 contact the upper end portion 264 first when joining the housing 232 and the housing cover 234 together, such that the other end 254N5 of the ground line 254 attached to the housing cover 234 acts as an assembly guide for the housing cover 234.

First Modified Example of Sixth Exemplary Embodiment

Explanation follows regarding a first modified example of the sixth exemplary embodiment of the present disclosure. In the present modified example, configurations equivalent to those of the first to the sixth exemplary embodiments are allocated the same reference numerals, and detailed explanation thereof is omitted.

Figure 15A:
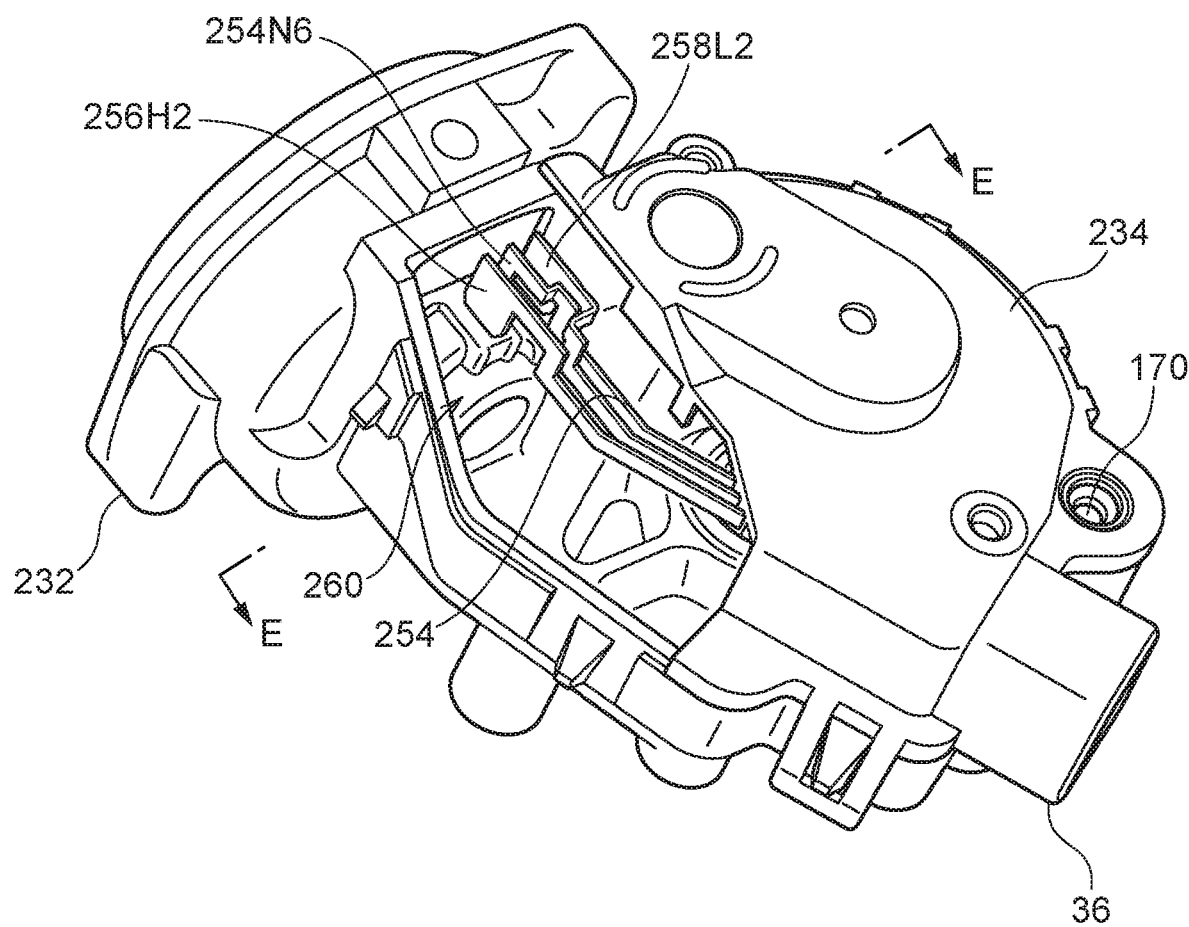
FIG. 15A is a perspective view illustrating a housing cover when joined to housing of a wiper motor according to a first modified example of the present disclosure.
Figure 15B:
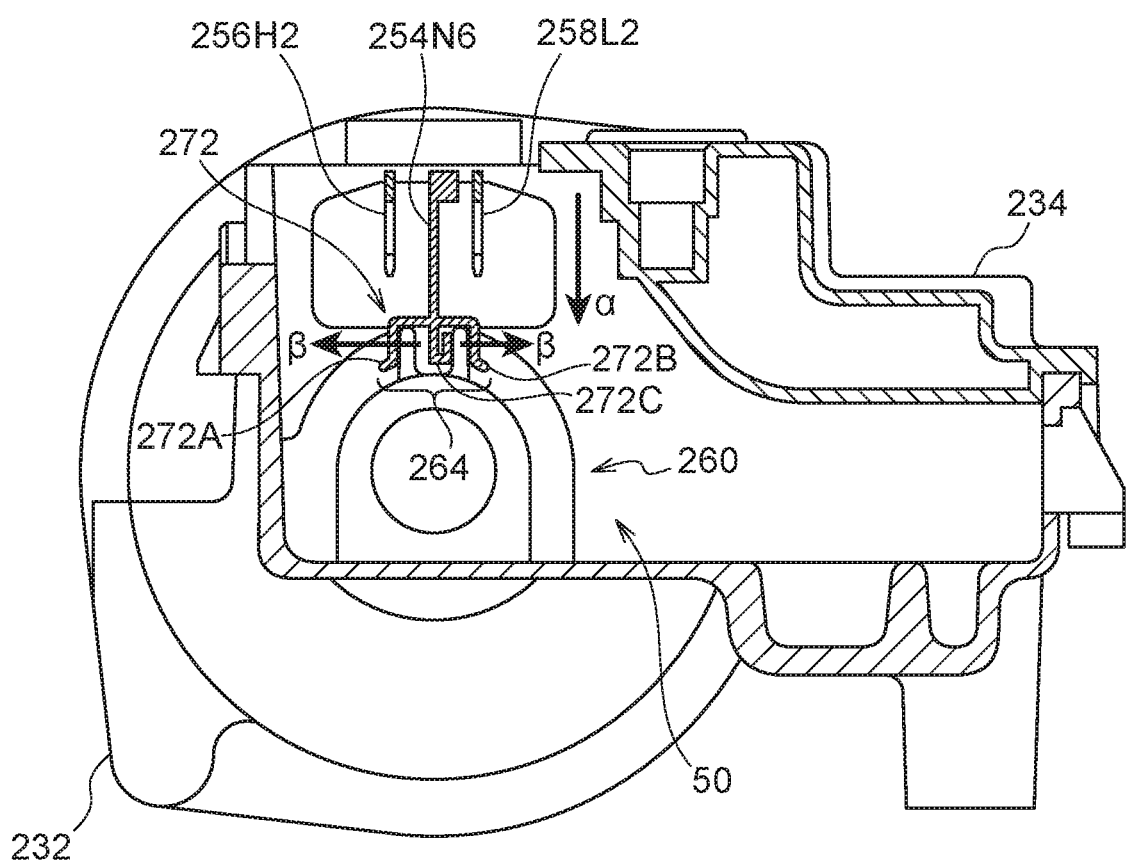
FIG. 15B is a cross-section illustrating the housing with the housing cover joined thereto, as sectioned along line E-E in FIG. 15A.

FIG. 15A is a perspective view illustrating the housing cover 234 when joined to the housing 232 of a wiper motor according to the present modified example. FIG. 15B is a cross-section of the housing 232 with the housing cover 234 joined thereto, as sectioned along line E-E in FIG. 15A. As illustrated in FIG. 15A, the ground line 254 includes an other end 254N6. The other end 254N6 is electrically connected to the upper end portion 264 of the bulge 260.

A leading end portion 272 of the other end 254N6 of the ground line 254 includes terminal ends 272A, 272B that spread toward the outer side with respect to the upper end portion 264 of the bulge 260 so as to cover the upper end portion 264, similarly to in the sixth exemplary embodiment. A terminal end 272C abuts a side face portion of a recess (groove) in the upper end portion 264, thus forming a reliable electrical connection with the bulge 260. The terminal end 272C is bent so as to contact the side face portion of the recess in the upper end portion 264, and when the housing cover 234 is being joined to the housing 232 in an assembly direction α, the terminal end 272C flexes in a flexing direction β substantially orthogonal to the assembly direction α. This results in a side face portion of the terminal end 272C abutting the side face portion of the recess in the upper end portion 264.

As described above, the negative terminal 40N of the brush 40 is electrically connected to the partitioning wall 50 cast integrally with the bulge 260, and the leading end portion 272 of the other end 254N6 of the ground line 254 contact the upper end portion 264 of the bulge 260 and the side face portion of the recess in the upper end portion 264, enabling the ground line 254 to be electrically connected in the close vicinity of the negative terminal 40N of the brush 40. This enables the distance over which the noise component travels through the housing 232 from the negative terminal 40N of the brush 40 to the ground line 254 to be made shorter.

As described above, in the present modified example, the distance over which the noise component flows through the housing 232 is shorter than in the first exemplary embodiment and the second exemplary embodiment, thereby suppressing the noise component from radiating toward the exterior.

Moreover, by forming the leading end portion 272 of the other end 254N6 of the ground line 254 so as to cover the upper end portion 264 of the bulge 260 and so as to contact the side face portion of the recess in the upper end portion 264, the ground line 254 and the housing 232 can be connected together more reliably than in the sixth exemplary embodiment.

Moreover, in the present modified example, there is no need to form the lip 262 which requires detailed processing, enabling manufacturing costs of the housing 232 to be reduced in comparison to the third exemplary embodiment and the like.

Moreover, in the present exemplary embodiment, the terminal ends 270A, 270B of the leading end portion 272 of the other end 254N6 of the ground line 254 spread toward the outer side with respect to the upper end portion 264, such that the terminal ends 270A, 270B of the leading end portion 272 of the other end 254N6 of the ground line 254 contact the upper end portion 264 first when joining the housing 232 and the housing cover 234 together. The other end 254N6 of the ground line 254 attached to the housing cover 234 accordingly acts as an assembly guide for the housing cover 234.

Second Modified Example of Sixth Exemplary Embodiment

Explanation follows regarding a second modified example of the sixth exemplary embodiment of the present disclosure. In the present modified example, configurations equivalent to those of the first to the sixth exemplary embodiments are allocated the same reference numerals, and detailed explanation thereof is omitted.

Figure 16A:
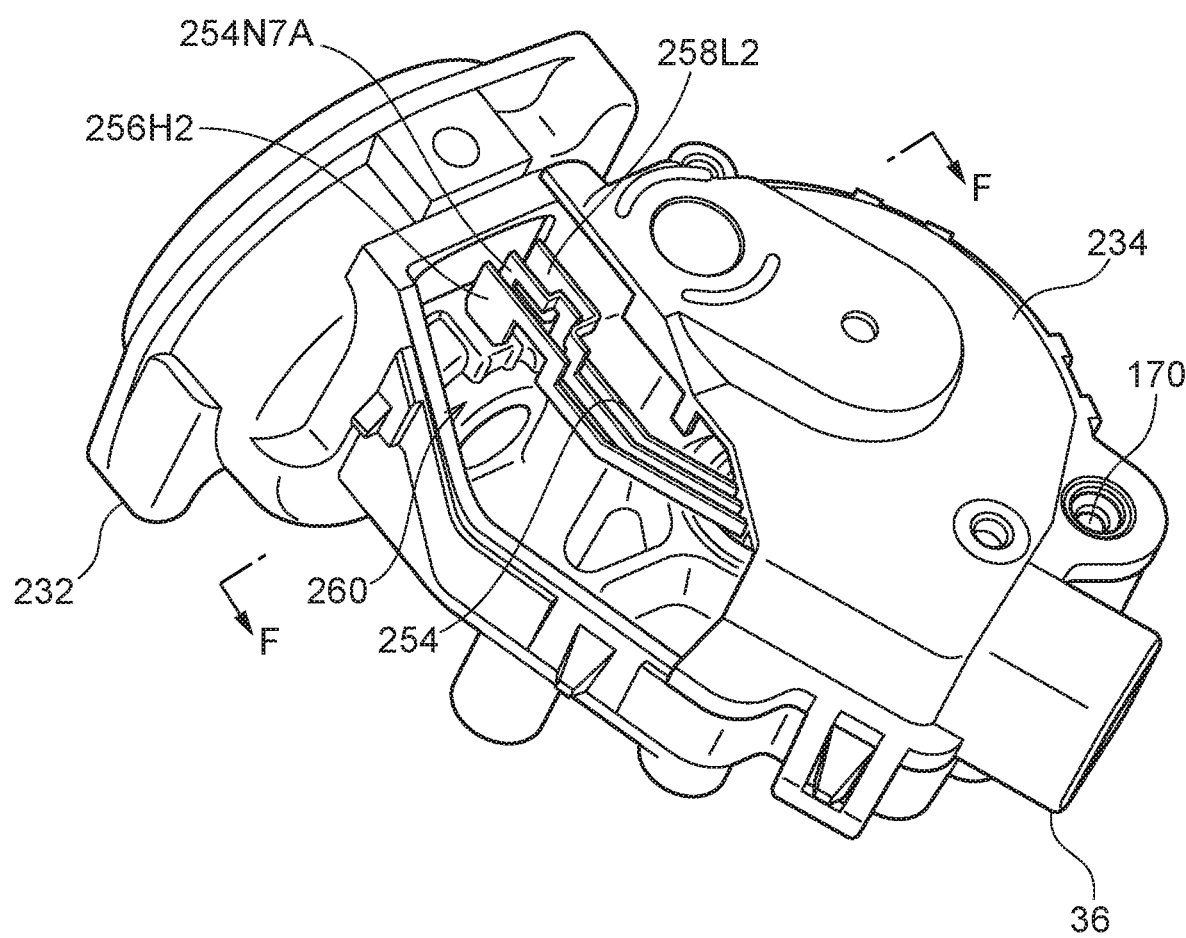
FIG. 16A is a perspective view illustrating a housing cover when joined to housing of a wiper motor according to a second modified example of the present disclosure.
Figure 16B:
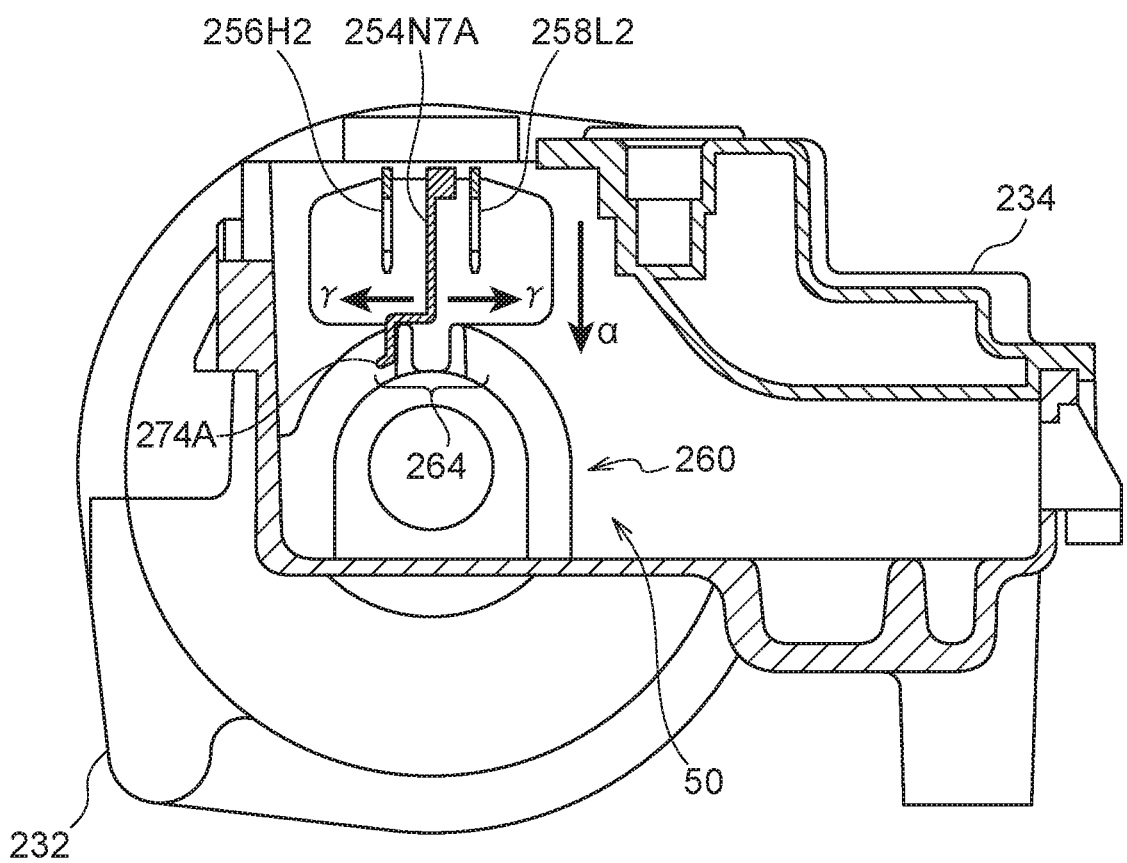
FIG. 16B is a cross-section illustrating the housing with the housing cover joined thereto, as sectioned along line F-F in FIG. 16A.

FIG. 16A is a perspective view illustrating the housing cover 234 when joined to the housing 232 of a wiper motor according to the present modified example. FIG. 16B is a cross-section illustrating the housing 232 with the housing cover 234 joined thereto, as sectioned along line F-F in FIG. 16A. As illustrated in FIG. 16A, the ground line 254 includes an other end 254N7A, and a leading end portion 274A of the other end 254N7A is formed so as to cover one side face and part of an apex portion of the upper end portion 264 of the bulge 260, and is electrically connected to the bulge 260. The leading end portion 274A of the other end 254N7A spreads toward the outer side with respect to the upper end portion 264 of the bulge 260, such that the upper end portion 264 and the leading end portion 274A contact each other easily during assembly of the housing cover 234 to the housing 232. Moreover, the leading end portion 274A of the other end 254N7A flexes in a flexing direction γ substantially orthogonal to an assembly direction α when the housing cover 234 is being joined to the housing 232 along the assembly direction α. This results in the leading end portion 274A of the other end 254N7A being pressed against the apex portion of the upper end portion 264, thus forming a reliable electrical connection between the other end 254N7A and the upper end portion 264.

Figure 17A:
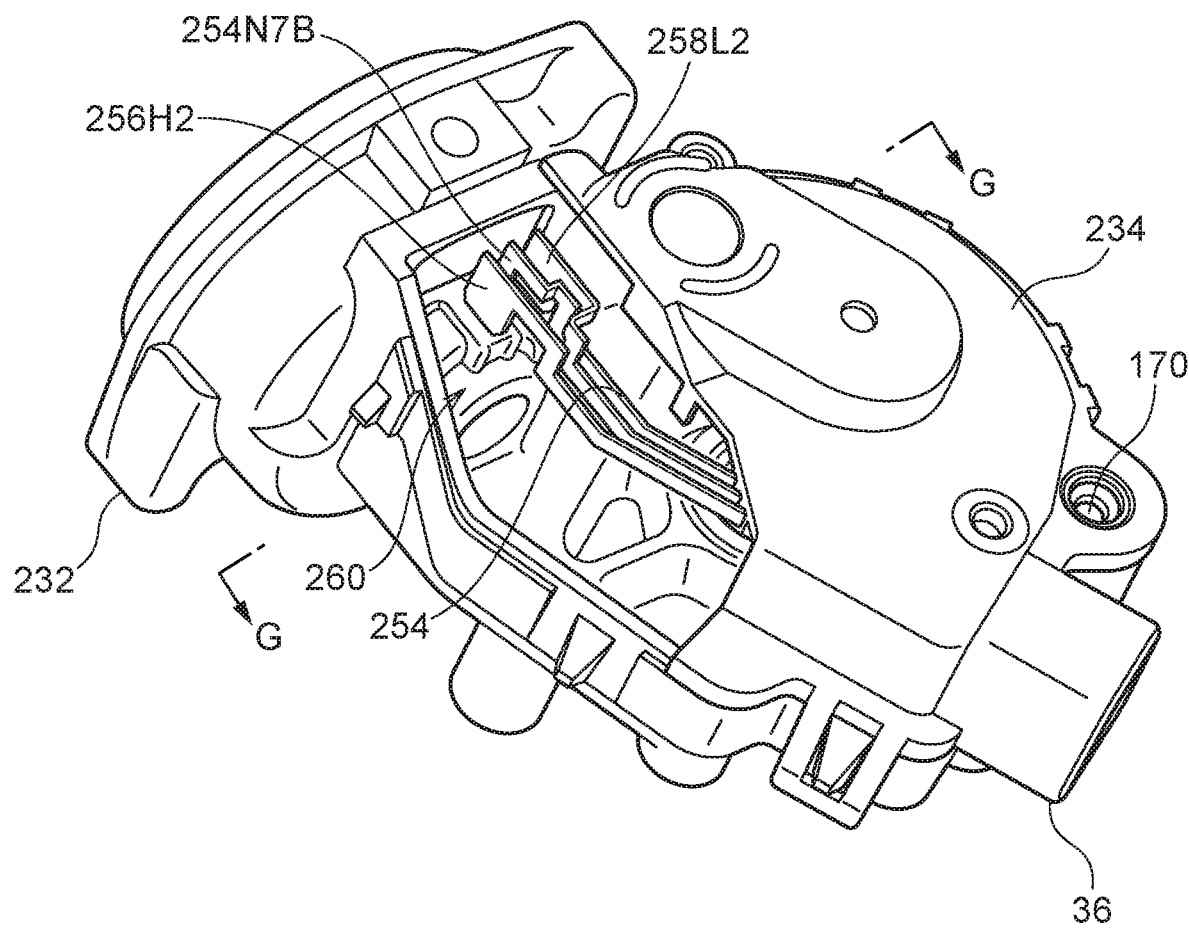
FIG. 17A is a perspective view illustrating a housing cover when joined to housing of a wiper motor according to another configuration of the second modified example of the present disclosure.
Figure 17B:
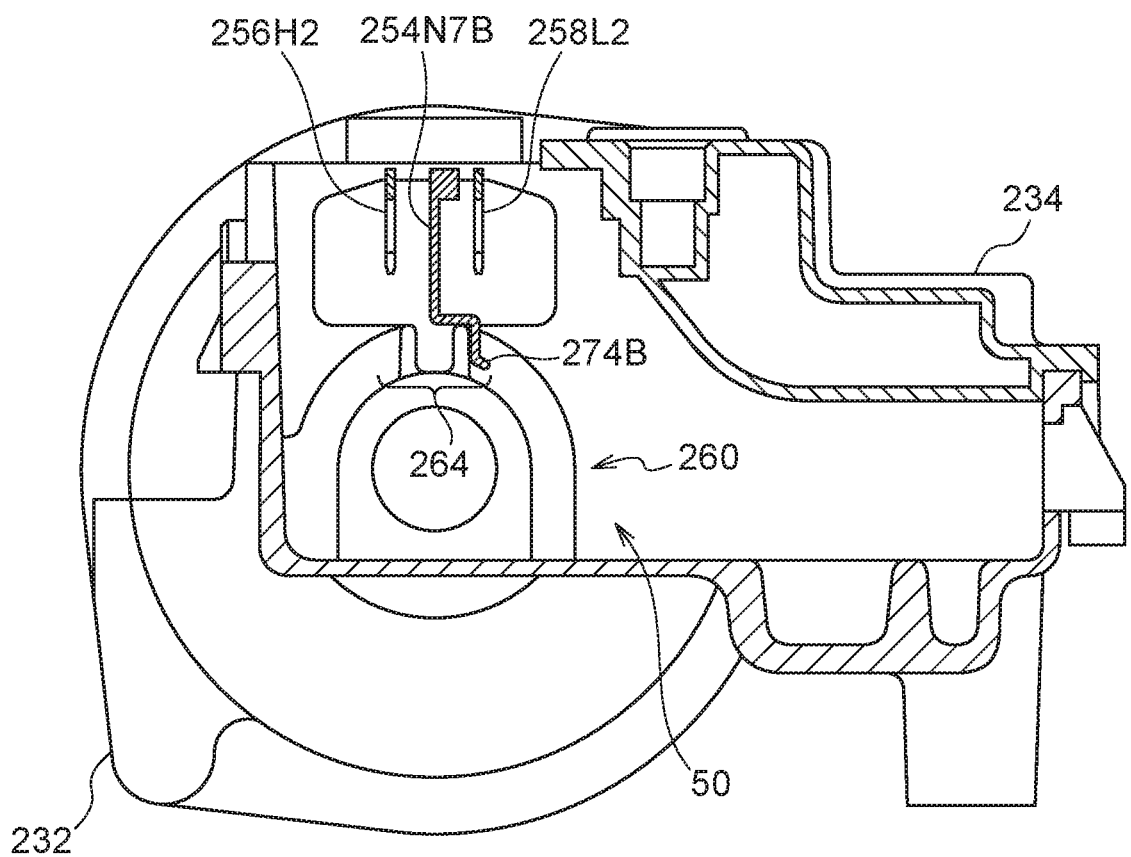
FIG. 17B is a cross-section illustrating the housing with the housing cover joined thereto, as sectioned along line G-G in FIG. 17A.

The present modified example may also be configured as illustrated in FIG. 17A and FIG. 17B. FIG. 17A is a perspective view illustrating the housing cover 234 when joined to the housing 232 of a wiper motor in another configuration of the present modified example. FIG. 17B is a cross-section illustrating the housing 232 with the housing cover 234 joined thereto, as sectioned along line G-G in FIG. 17A. As illustrated in FIG. 17A, the ground line 254 includes an other end 254N7B, and a leading end portion 274B of the other end 254N7B is formed so as to cover a different one side face and a different part of the apex portion of the upper end portion 264 of the bulge 260 to those in FIG. 16A and FIG. 16B. The leading end portion 274B of the other end 254N7B is electrically connected to the bulge 260. Alternatively, the other end of the ground line 254 may be formed so as to cover one side face and part of an apex portion of the upper end portion 264 and contact a side face portion of a recess (groove) in the upper end portion 264.

As described above, the negative terminal 40N of the brush 40 is electrically connected to the partitioning wall 50 that is cast integrally with the bulge 260, and the other end 254N7A or the other end 254N7B of the ground line 254 is made to contact the upper end portion 264 of the bulge 260, enabling the ground line 254 to be electrically connected in the close vicinity of the negative terminal 40N of the brush 40. This enables the distance over which the noise component travels through the housing 232 from the negative terminal 40N of the brush 40 to the ground line 254 to be made shorter.

As described above, in the present modified example, the distance over which the noise component flows through the housing 232 is shorter than in the first exemplary embodiment and the second exemplary embodiment, thereby suppressing the noise component from radiating toward the exterior.

Moreover, in the present modified example, there is no need to form the lip 262, which requires detailed processing, enabling the manufacturing cost of the housing 232 to be reduced in comparison to the third exemplary embodiment.

Furthermore, in the present modified example, it is sufficient that the other end 254N7A, 254N7B of the ground line 254 be formed so as electrically connect to one side face portion and one side of the apex portion of the upper end portion of the bulge 260, enabling the manufacturing cost of the product to be reduced in comparison to the first modified example.

The disclosures of Japanese Patent Application Nos. 2017-084035, filed on Apr. 20, 2017, and 2018-060588, filed on Mar. 27, 2018, are incorporated in their entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A wiper motor comprising:
   an electrically conductive housing in which a speed reduction mechanism is housed;
   a motor body housed within a yoke joined to the housing and including a power supply terminal that contacts a commutator so as to supply electric power to a rotor, and including a brush that includes a ground terminal having one end in contact with the commutator and another end connected to an electrically conductive partitioning wall of the housing that covers an opening in the yoke;

a bulge provided at the partitioning wall so as to retain a bearing of a rotation shaft of the motor body;

a power supply line configured to supply electric power to the power supply terminal; and a ground line that directly contacts a face of the bulge and is connected to ground.

2. The wiper motor of claim 1, wherein:

the bulge includes a lip configured to anchor a terminal by sandwiching the terminal; and one end of the ground line is formed so as to be anchored to the lip.

3. The wiper motor of claim 2, wherein one end of the ground line deforms in a direction intersecting a direction of assembling a housing cover to the housing so as to contact an inside face of the lip.

4. The wiper motor of claim 2, wherein a leading end portion of one end of the ground line is bent so as to contact an inside face of the lip.

5. The wiper motor of claim 1, wherein one end of the ground line is formed so as to sandwich a side face of the bulge.

6. The wiper motor of claim 1, wherein:

the bulge includes a protrusion; and one end of the ground line is formed so as to contact an apex portion and a side face of the protrusion.

7. The wiper motor of claim 6, wherein one end of the ground line is formed so as to contact part of an apex portion and one side face of the protrusion.

8. The wiper motor of claim 6, wherein:

the protrusion includes a groove in the apex portion; and the one end of the ground line is formed so as to contact a side face portion of the groove.

9. A wiper motor comprising:

an electrically conductive housing in which a speed reduction mechanism is housed;

a motor body housed within a yoke joined to the housing and including a power supply terminal that contacts a commutator so as to supply electric power to a rotor, and including a brush that includes a ground terminal having one end in contact with the commutator and another end connected to an electrically conductive partitioning wall of the housing that covers an opening in the yoke;

a bulge provided at the partitioning wall so as to retain a bearing of a rotation shaft of the motor body;

a power supply line configured to supply electric power to the power supply terminal; and a ground line connected to the bulge and to ground, wherein:

the bulge includes a lip configured to anchor a terminal by sandwiching the terminal; and one end of the ground line is formed so as to be anchored to the lip.

10. The wiper motor of claim 9, wherein one end of the ground line deforms in a direction intersecting a direction of assembling a housing cover to the housing so as to contact an inside face of the lip.

11. The wiper motor of claim 9, wherein a leading end portion of one end of the ground line is bent so as to contact an inside face of the lip.

12. A wiper motor comprising:

an electrically conductive housing in which a speed reduction mechanism is housed;

a motor body housed within a yoke joined to the housing and including a power supply terminal that contacts a commutator so as to supply electric power to a rotor, and including a brush that includes a ground terminal having one end in contact with the commutator and another end connected to an electrically conductive partitioning wall of the housing that covers an opening in the yoke;

a bulge provided at the partitioning wall so as to retain a bearing of a rotation shaft of the motor body;

a power supply line configured to supply electric power to the power supply terminal; and a ground line connected to the bulge and to ground, wherein:

the bulge includes a protrusion; and one end of the ground line is formed so as to contact an apex portion and a side face of the protrusion.

13. The wiper motor of claim 12, wherein one end of the ground line is formed so as to contact part of an apex portion and one side face of the protrusion.

14. The wiper motor of claim 12, wherein:

the protrusion includes a groove in the apex portion; and the one end of the ground line is formed so as to contact a side face portion of the groove.

* * * * *